United States Patent
Lu et al.

(10) Patent No.: US 11,877,321 B2
(45) Date of Patent: Jan. 16, 2024

(54) CONSTRAINED MULTI-LINK DEVICE OPERATIONS IN WIRELESS COMMUNICATIONS

(71) Applicant: MediaTek Singapore Pte. Ltd., Singapore (SG)

(72) Inventors: Kai Ying Lu, San Jose, CA (US); Yongho Seok, San Jose, CA (US); Weisung Tsao, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 74 days.

(21) Appl. No.: 17/134,231

(22) Filed: Dec. 25, 2020

(65) Prior Publication Data

US 2021/0212118 A1 Jul. 8, 2021

Related U.S. Application Data

(60) Provisional application No. 63/112,211, filed on Nov. 11, 2020, provisional application No. 63/076,981, (Continued)

(51) Int. Cl.
*H04W 56/00* (2009.01)
*H04W 74/00* (2009.01)
(Continued)

(52) U.S. Cl.
CPC ....... *H04W 74/0816* (2013.01); *H04W 76/15* (2018.02)

(58) Field of Classification Search
CPC . H04W 84/12; H04W 56/0045; H04W 28/02; H04B 1/005; H04L 12/189; H04L 2101/677
(Continued)

(56) References Cited

U.S. PATENT DOCUMENTS

2016/0105909 A1 4/2016 Seok et al.
2016/0157266 A1 6/2016 Wang et al.
(Continued)

FOREIGN PATENT DOCUMENTS

CN 109314997 A 2/2019

OTHER PUBLICATIONS

European Patent Office, European Search Report for European Patent Application No. 20217756.4, dated Jun. 2, 2021.
(Continued)

*Primary Examiner* — Wutchung Chu
*Assistant Examiner* — Jason A Harley
(74) *Attorney, Agent, or Firm* — Han IP PLLC; Andy M. Han

(57) ABSTRACT

A multi-link device (MLD) monitors each of first and second links in a multi-link operation in wireless communications, with the first link being a primary link and the second link being a secondary link. The MLD obtains a transmission opportunity (TXOP) on one of the first link and the second link as a result of performing a contention-based channel access on the first link and the second link. The MLD checks channel status of the other of the first link and the second link. The MLD then transmits one or more frames on the first link but not on the second link, on the second link but not on the first link, or on both the first link and the second link synchronously, responsive to the channel status of the other link given the TXOP being obtained on the one of the first link and the second link.

20 Claims, 17 Drawing Sheets

Related U.S. Application Data filed on Sep. 11, 2020, provisional application No. 62/956,353, filed on Jan. 2, 2020.

(51) Int. Cl.
| | |
|---|---|
| *H04W 52/14* | (2009.01) |
| *H04W 72/04* | (2023.01) |
| *H04W 36/00* | (2009.01) |
| *H04L 5/00* | (2006.01) |
| *H04W 40/02* | (2009.01) |
| *H04B 7/06* | (2006.01) |
| *H04W 74/08* | (2009.01) |
| *H04W 76/15* | (2018.01) |

(58) Field of Classification Search
USPC ........................................ 370/278; 455/554.2
See application file for complete search history.

(56) References Cited

U.S. PATENT DOCUMENTS

| | | | |
|---|---|---|---|
| 2016/0295599 | A1 | 10/2016 | Liu et al. |
| 2018/0288799 | A1* | 10/2018 | Min ................ H04W 74/0808 |
| 2019/0082463 | A1* | 3/2019 | Patil ................ H04W 74/0808 |
| 2019/0158385 | A1* | 5/2019 | Patil ...................... H04W 76/15 |
| 2019/0268956 | A1* | 8/2019 | Xiao ..................... H04W 48/12 |
| 2021/0076412 | A1* | 3/2021 | Naribole .............. H04W 76/15 |
| 2021/0368491 | A1* | 11/2021 | Song ........................ H04L 1/18 |

OTHER PUBLICATIONS

Yongho Seok (Mediatek) et al., "Multi-Link Operation Simulation Methodology", IEEE Draft, 11-19-1927-00-00BE-Multi-Link-Operation-Simulation-Methodology, IEEE-SA Mentor, Piscataway, USA.

Sharan Naribole (Samsung) et al., "Multi-link Channel Access Discussion", IEEE Draft, 11-19-1405-07-00BE-Multi-Link-Operation-Channel-Access-Discussion, IEEE-SA Mentor, Piscataway, USA.

Sharan Naribole (Samsung) et al., "Synchronous Multi-link Transmission of Non-STR MLD", IEEE Draft, 11-19-1505-02-00BE-Multi-Link-Aggregation-Considerations, IEEE-SA Mentor, Piscataway, USA.

Yongho Seok (Mediatek) et al., "Multi-Link Operation Simulation Methodology", IEEE Draft, 11-20-1053-01-00BE-Synchronous-Multi-Link-Transmission-of_non-STR-MLD, IEEE-SA Mentor, Piscataway, USA.

Yongho Seok (Mediatek) et al., "Constrained Multi-link Operation", IEEE Draft, 11-19-1959-01-00BE-Constrained-Multi-Link-Operation, IEEE-SA Mentor, Piscataway, USA.

Sunghyun Hwang (ETRI) et al., "Multi-link RTS-CTS operations with non-STR non-AP MLD", IEEE Draft, 11-20-0968-02-00BE-Multi-Link-RTS-CTS-Operations-With-Non-STR-STA-MLD, IEEE-SA Mentor, Piscataway, USA.

Taiwan Intellectual Property Office, Office Action for Taiwan Patent Application No. 109146828, dated Jun. 30, 2021.

Taiwan Intellectual Property Office, Office Action for Taiwan Patent Application No. 109146828, dated Feb. 9, 2022.

Sharan Naribole (Samsung), "Multi-link Aggregation Considerations", IEEE 802.11-19/1505rl, Sep. 15, 2019, slides 4-6.

China National Intellectual Property Administration, First Office Action in China Patent Application No. 202011599896.1, dated Jul. 20, 2023.

Yongho Seok et al.: "Multi-Link Operation Simulation Methodology", IEEE, Nov. 9, 2019, pp. 11-13.

Sharan Naribole et al.: "Multi-link TXOP Aggregation Consideration", IEEE Oct. 31, 2019, pp. 5-6.

Sharan Naribole et al.: "Multi-link Channel Access Discussion", IEEE Oct. 31, 2019, pp. 4-11.

* cited by examiner

CONSTRAINED MULTI-LINK DEVICE OPERATIONS IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 62/956,353, filed 2 Jan. 2020, U.S. Provisional Patent Application No. 63/076,981, filed 11 Sep. 2020, U.S. Provisional Patent Application No. 63/112,211, filed 11 Nov. 2020, the contents of which being incorporated by reference in their entirety.

TECHNICAL FIELD

The present disclosure is generally related to wireless communications and, more particularly, to constrained multi-link device operations in wireless communications.

BACKGROUND

Unless otherwise indicated herein, approaches described in this section are not prior art to the claims listed below and are not admitted as prior art by inclusion in this section.

In the context of wireless communications such as wireless local area network (WLANs) in accordance with next-generation Institute of Electrical and Electronics Engineers (IEEE) 802.11 standards (e.g., IEEE 802.11be), a constrained access point (AP) multi-link device is designed to support multi-link operations on multiple links (e.g., two or more links) at different frequencies. However, there tends to be an in-device coexistence (IDC) interference when two links are close to each other so that the constrained multi-link device cannot support simultaneous transmit and receive on the two links. For example, when the AP multi-link device (MLD) transmits on a first link, leakage of the transmit power onto a second link would severely interfere the reception of frames on the second link. As another example, when the AP MLD is receiving uplink (UL) frames on the first link, if one or more non-synchronized UL frames is/are received on the second link due to random channel access, the transmit power of transmission of an acknowledgement on the second link might interrupt the remaining reception of the UL frames on the first link. As yet another example, when there are legacy stations (STAs) or single-link STAs, which are not capable of multi-link operations, different STAs may contend the channels on different links without knowing channel status of other link(s).

Thus, an AP capable of multi-link operations and with constraints on simultaneous reception (RX) and transmission (TX) on a pair of links would likely experience certain problems. One problem is that the worst interference could happen when a downlink (DL) transmission on one link and an UL transmission on the other link overlap most of time. Another problem is that non-synchronized UL transmissions on different links from different non-AP devices could be interrupted due to random channel access. A further problem is that, when there are legacy STAs or single-link STAs, it would be difficult for the AP to coordinate the transmissions on two links.

Therefore, there is a need for a solution to improve spectrum efficiency for the links operated by an AP MLD with IDC interference problems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses to address aforementioned issues/problems. Under various schemes proposed herein, some rules pertaining to constrained AP multi-link device operations in wireless communications may be implemented to avoid overlap between DL and UL transmissions or between UL and UL transmissions on different links from two different devices.

In one aspect, a method may involve monitoring each of a first link and a second link in a multi-link operation in wireless communications, with the first link being a primary link and the second link being a secondary link. The method may also involve obtaining a transmission opportunity (TXOP) on one of the first link and the second link as a result of performing the contention-based channel access on the first link and the second link. The method may further involve checking channel status of the other of the first link and the second link. The method may additionally involve transmitting one or more frames on the first link but not on the second link, on the second link but not on the first link, or on both the first link and the second link synchronously responsive to the channel status of the other link given the TXOP being obtained on one of the first link and the second link.

In another aspect, a method may involve maintaining a respective backoff timer for each of a first link and a second link in a multi-link operation in wireless communications. The method may also involve determining whether to participate in a TXOP on either of the first link and the second link either upon the respective backoff timer counting down to zero or upon receiving a request to send (e.g., RTS frame) or a data frame. The method may further involve suspending channel access on the other link of the first link and the second link responsive to determining to participate in the TXOP on one of the first link and the second link.

In still another aspect, a method may involve performing a backoff procedure to count down to zero on a first link in a multi-link operation in wireless communications. The method may also involve determining whether channel status of the first link is still idle when one other backoff procedure counts down to zero on a second link in the multi-link operation. The method may further involve performing a transmission on the first link synchronously with another transmission on the second ink responsive to determining that the channel status of the first link is still idle when the other backoff procedure counts down to zero on the second link.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to constrained multi-link device operations in wireless communications. According to the present disclosure, a number of possible solutions may be implemented separately or jointly. That is, although these possible solutions may be described below separately, two or more of these possible solutions may be implemented in one combination or another.

Figure 1:
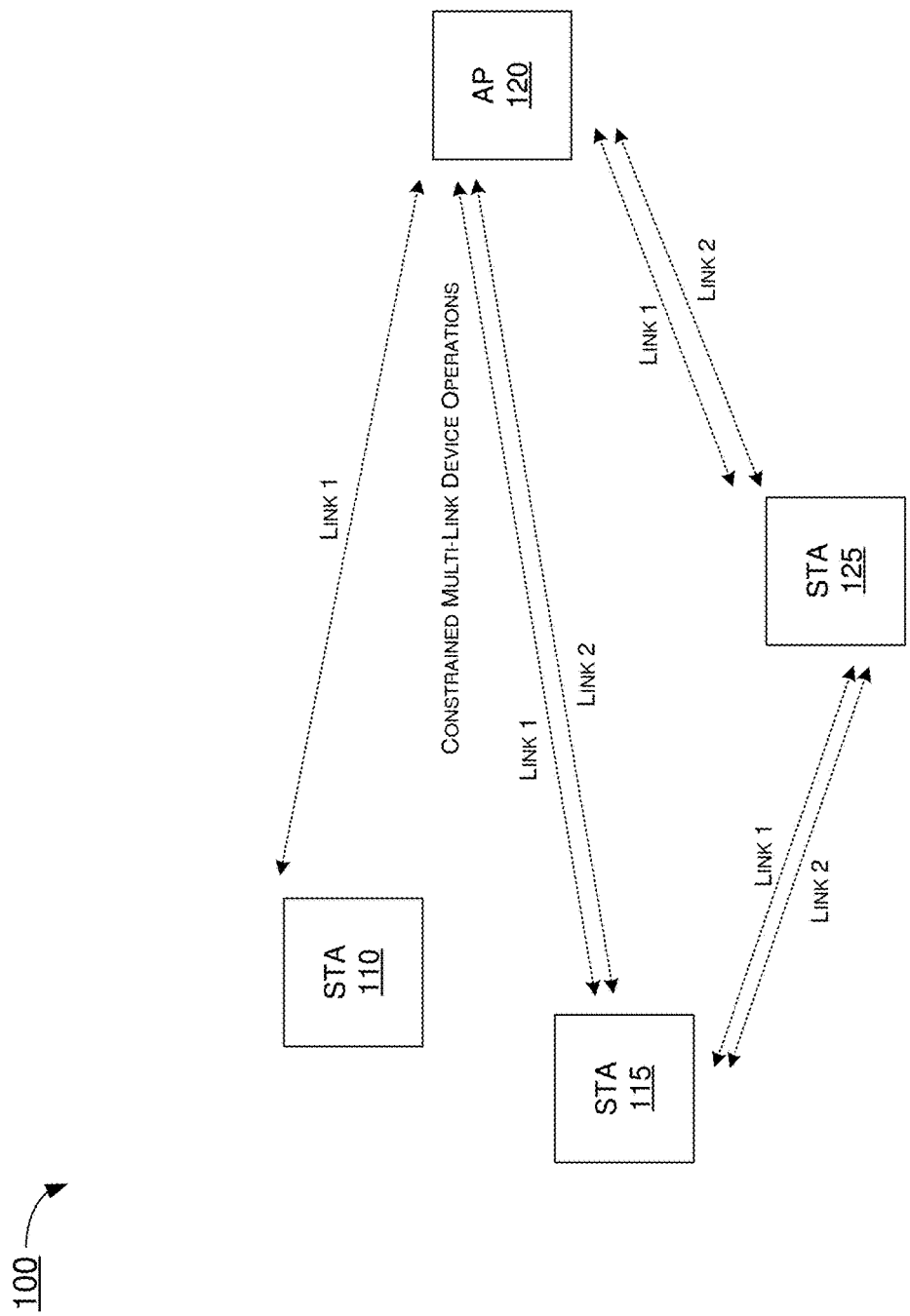
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 9 illustrate examples of implementation of various proposed schemes in network environment 100 in accordance with the present disclosure. The following description of various proposed schemes is provided with reference to FIG. 1~FIG. 9.

Referring to FIG. 1, network environment 100 may involve at least an STA 110 and another STA 115 that are associated with, and communicating wirelessly with, an AP 120 in accordance with one or more IEEE 802.11 standards. Network environment 100 may further include one or more other STAs such as STA 125. Each of STA 110, STA 115 and STA 125 may function as an AP or, alternatively, as a non-AP STA. STA 110 may be a legacy STA or single-link STA, and may not support multi-link operations. Each of STA 115 (herein interchangeably referred to and denoted as "STA1") and STA 125 (herein interchangeably referred to and denoted as "STA2") may be a single radio or multi-radio multi-link STA with one or more links (e.g., link 1 and link 2) operating in, for example and without limitation, the 2.4 GHz band, 5 GHz-band and/or 6 GHz band. Similarly, AP 120 may be single radio or multi-radio multi-link capable and thus may communicate with STA110 over one link (e.g., link1) and with STA 115 and/or STA 125 over one or more links (e.g., link 1 and link 2). STA 115 and STA 125 may communicate with each other as direct link over one or more links (e.g., link 1 and link 2). In the present disclosure, each of STA 115, STA 125 and AP 120 may be interchangeably referred to or otherwise denoted as a multi-link logical entity (MLLE) or multi-link device (MLD). Specifically, each of STA 115 and STA 125 may be interchangeably referred to or otherwise denoted as a non-AP MLLE or non-AP MLD or non-AP single radio multi-link device (non-AP SRMLD), and AP 120 may be interchangeably referred to or otherwise denoted as an AP MLLE or AP MLD or AP single radio multi-link device (AP SRMLD). Under various proposed schemes in accordance with the present disclosure, STA110, STA 115, STA 125 and AP 120 may be configured to perform constrained multi-link device operations in accordance with various proposed schemes described below. It is noteworthy that the term "STA" is a general name used to refer to either a "non-AP STA" or an "AP STA" herein. Moreover, an "AP STA" is interchangeably referred to as an "AP" and a "non-AP STA" is interchangeably referred to as an "STA" herein.

Figure 2:
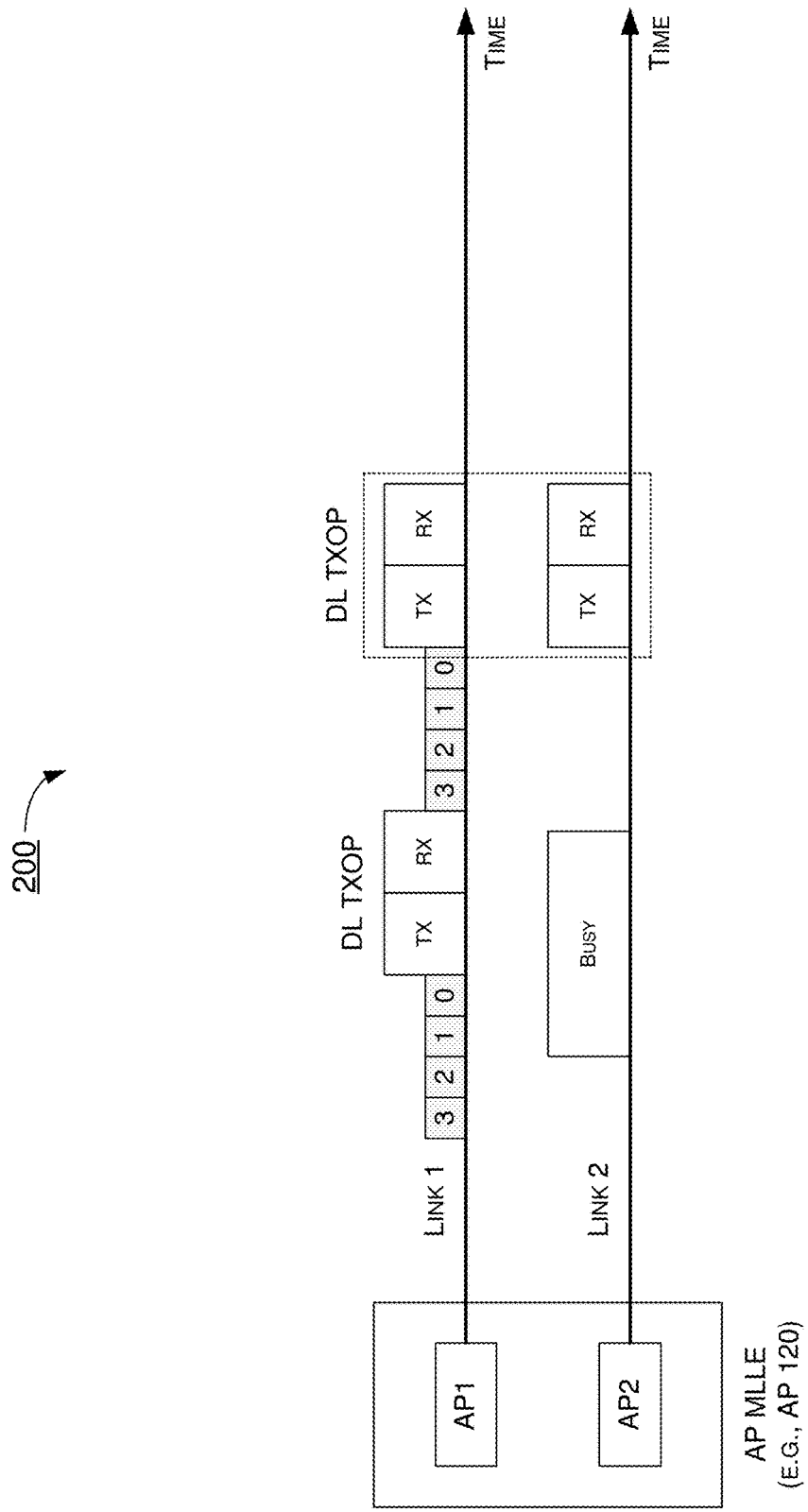
FIG. 2 is a diagram of an example scenario in accordance with the present disclosure.

FIG. 2 illustrates an example scenario 200 of a constrained MLD operation in accordance with the present disclosure. In scenario 200, a constrained AP MLD (e.g., AP 120, denoted as "AP MLLE" in FIG. 2), which supports multi-link operations but has an IDC interference, may operate on at least two links, such as link 1 and link 2, under one of a first approach (option 1), a second approach (option 2) and a third approach (option 3) in accordance with a first proposed scheme of the present disclosure. Under the first approach of the first proposed scheme, an AP (denoted as "AP1" in FIG. 2) affiliated with the constrained AP MLD on link 1 may perform a contention on a primary channel of link 1 (e.g., in a single-primary link mode). After obtaining a TXOP on link 1 (e.g., upon a backoff timer counting down to zero), the AP MLD may check channel status on link 2. In an event that AP2 affiliated with the AP MLD is not participating in an ongoing TXOP for UL frame exchanges on link 2, the AP1 of the AP MLD may transmit frame(s) over link 1. More specifically, in an event that the channel status of link 2 is idle (e.g., virtual carrier sensing (CS) being idle (e.g., network allocation vector (NAV)=0)), a point coordination function (PCF) inter-frame space (PIFS) CS being idle (e.g., by checking clear channel assessment (CCA) energy) and/or a backoff timer counting down to zero or is already zero, the AP MLD may transmit frames over both link 1 and link 2 synchronously. In an event that the channel status of link 2 is not idle (e.g., virtual CS busy (e.g., NAV is not zero), PIFS CS busy, and/or a backoff timer is not zero or suspended due to channel busy), the AP1 of the AP MLD may transmit frames on link 1 only.

Figure 3:
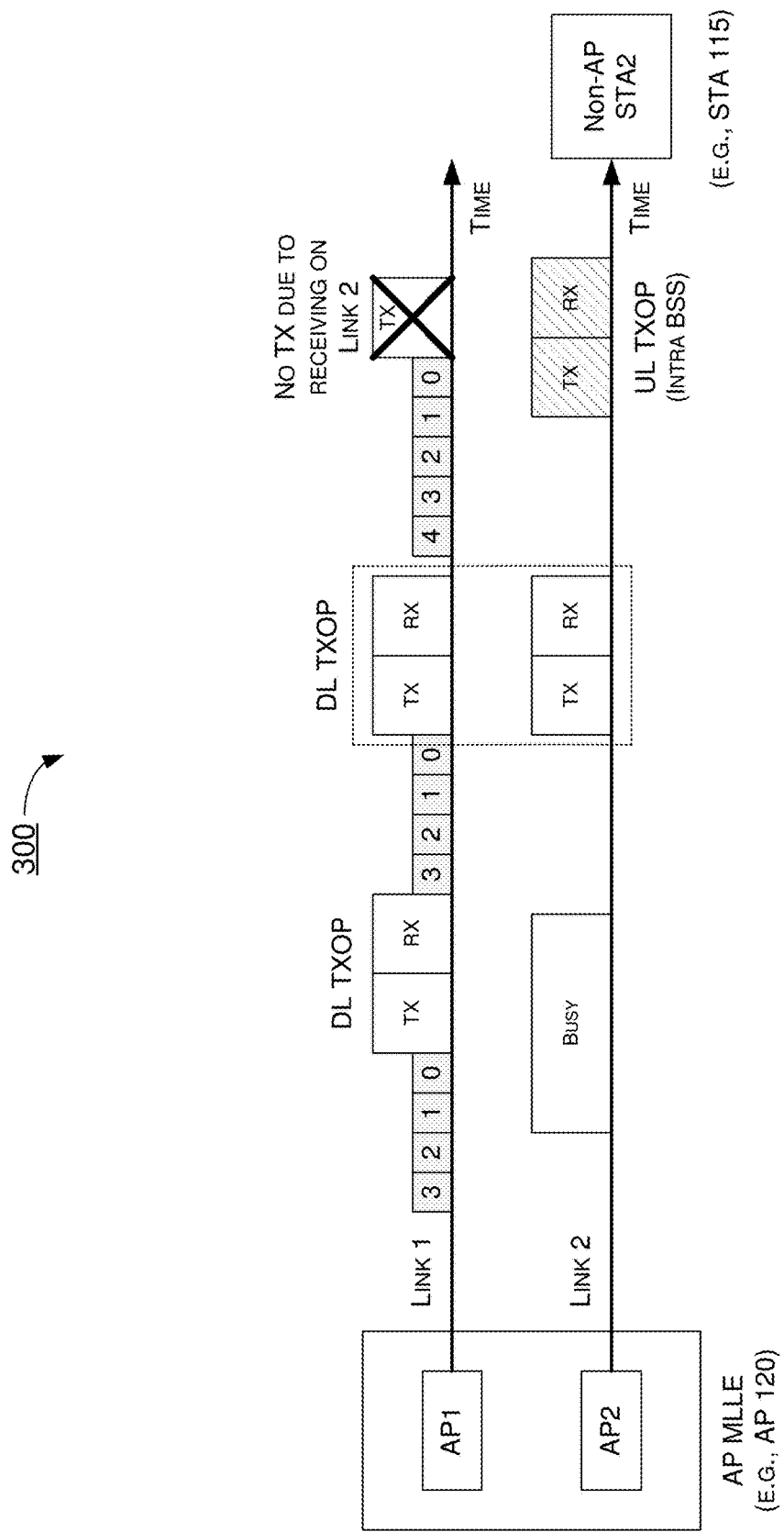
FIG. 3 is a diagram of an example scenario in accordance with the present disclosure.

FIG. 3 illustrates an example scenario 300 of a constrained MLD operation in accordance with the present disclosure. In scenario 300, a constrained AP MLD (e.g., AP 120, denoted as "AP MLLE" in FIG. 3), which supports multi-link operations but has an IDC interference, may operate on at least two links, such as link 1 and link 2, under the first approach in accordance with the first proposed scheme of the present disclosure. Under the first approach, an AP (denoted as "AP1" in FIG. 3) of the constrained AP MLD may perform a contention on a primary channel of link 1 (e.g., in a single-primary link mode). After obtaining a TXOP on link 1 (e.g., upon a backoff timer counting down to zero), the AP MLD may check channel status on link 2. In an event that the AP2 of the AP MLD participates in another TXOP for UL frame exchanges on link 2 with an non-AP MLD (e.g., STA 115, denoted as "non-AP STA2" in FIG. 3), AP1 may not transmit frames on link 1 during that other TXOP during which AP MLD participates in UL frame exchanges with non-AP STA2.

Under the second approach of the first proposed scheme, a STA of the constrained AP MLD or the constrained/non-constrained non-AP MLD may perform a contention on the primary channel of link 1 (e.g., in a single-primary link mode). In an event that the AP MLD or the non-AP MLD is participating in or detected an ongoing TXOP for UL frame exchanges on link 2, the STA of the AP MLD or the non-AP MLD may suspend its backoff procedure on link 1. Moreover, under the second approach, after obtaining a TXOP on link 1, the AP MLD or the non-AP MLD may check channel status of link 2. In an event that the channel status of link 2 is idle (e.g., virtual CS idle (e.g., NAV=0), PIFS CS idle and/or a backoff timer counting down to zero or is already zero), the AP MLD or the non-AP MLD may transmit frame(s) over both link 1 and link 2 synchronously. In an event that the channel status of link 2 is not idle (e.g., NAV is not zero, PIFS CCA busy and/or a backoff timer is not zero), the AP MLD or the non-AP MLD may transmit frame(s) on link 1 only.

Figure 4:
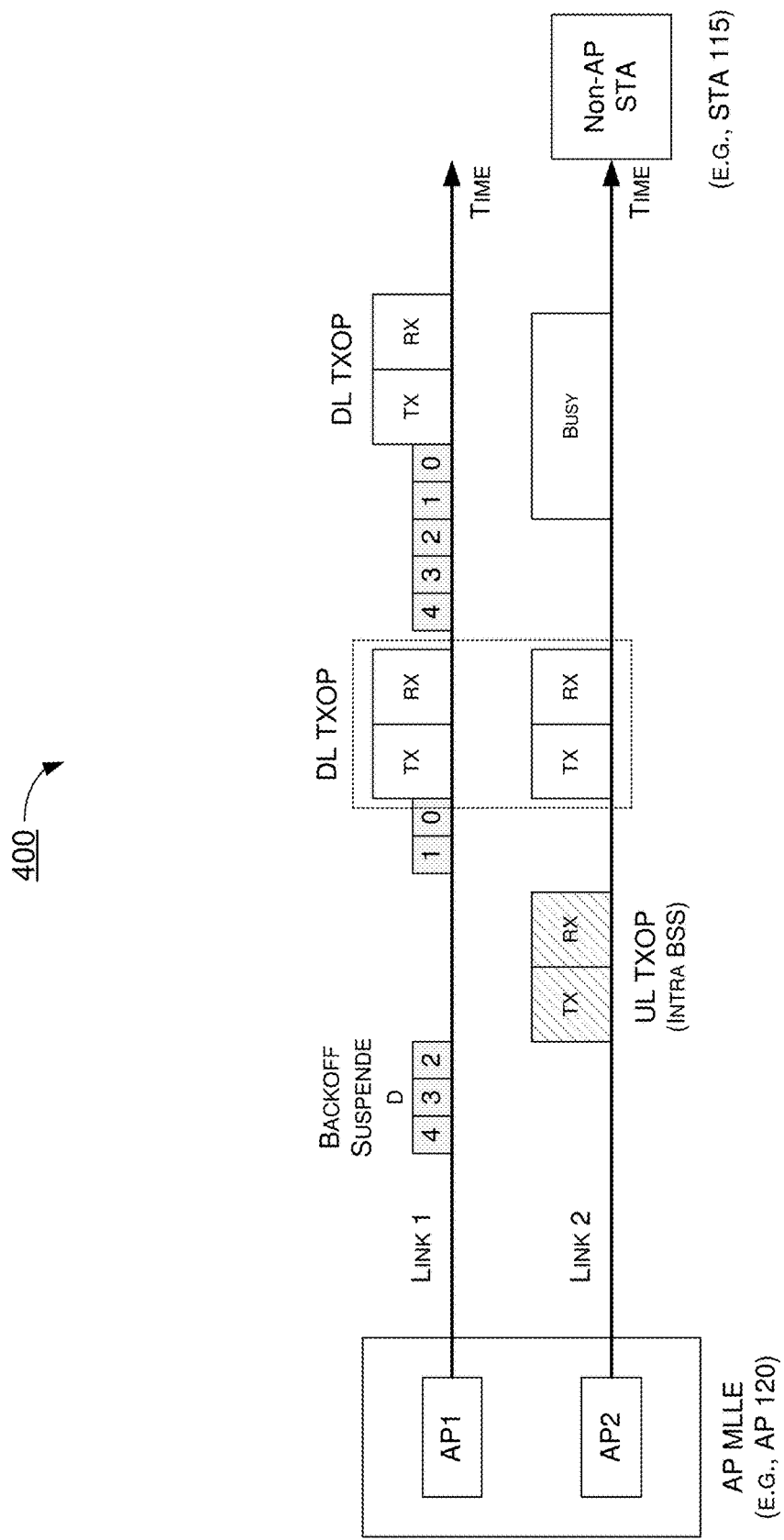
FIG. 4 is a diagram of an example scenario in accordance with the present disclosure.

FIG. 4 illustrates an example scenario 400 of a constrained MLD operation in accordance with the present disclosure. Scenario 400 shows an example implementation of the second approach of the first proposed scheme. In FIG. 4, "AP1" and "AP2" are two affiliated APs of an AP MLD, which each of AP1 and AP2 operating on a respective link. Referring to FIG. 4, a backoff procedure on link 1 may be related to the channel status of both link 1 and link 2. The backoff procedure of a STA (denoted as "AP1" in FIG. 4) of the AP MLD (e.g., AP120) on link 1 may be suspended in an event that another STA (e.g., denoted as "AP2" in FIG. 4) of the AP MLD (e.g., AP 120) is participating in an ongoing TXOP for UL frame exchanges on link 2 with a non-AP STA (e.g., STA 115) as if an internal collision happened. The backoff procedure of the STA of the AP MLD on link 1 may be resumed after the TXOP on link 2 ends.

Figure 5:
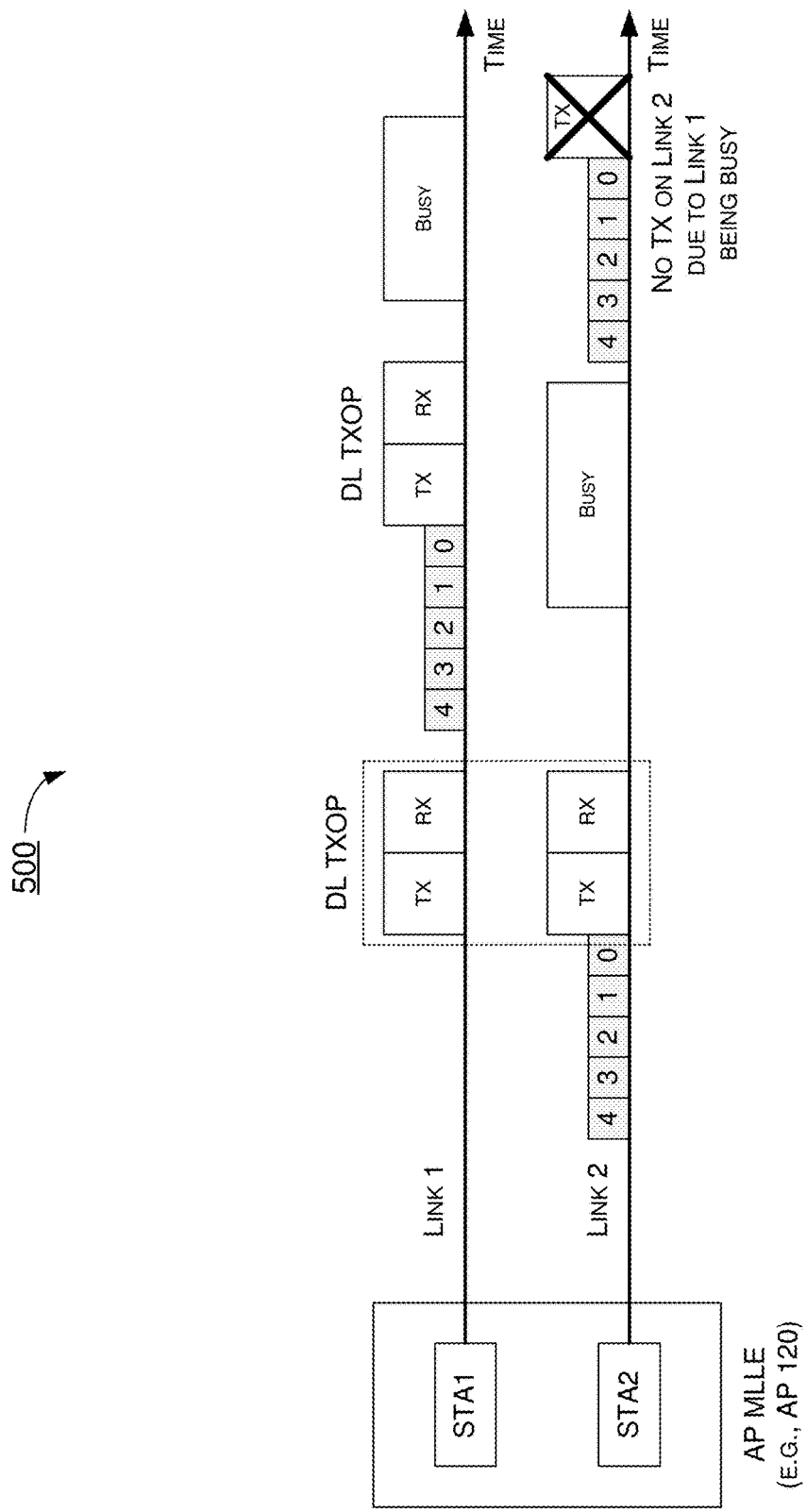
FIG. 5 is a diagram of an example scenario in accordance with the present disclosure.

FIG. 5 illustrates an example scenario 500 of a constrained MLD operation in accordance with the present disclosure. Scenario 500 shows an example implementation of the third approach of the first proposed scheme. Referring to FIG. 5, a STA (denoted as "AP1" in FIG. 5) of the constrained AP MLD (e.g., AP 120) may perform a contention on both the primary channel of link 1 and the primary channel of link 2 (e.g., in a multiple-primary link mode). Under the third approach, between link 1 and link 2, link 1 may be a primary link and link 2 may be a secondary link. Under the third approach, when a backoff timer of the STA of the constrained AP MLD backs off to zero in a backoff procedure on link 1, the AP MLD may check channel status of link 2. In an event that the channel status of link 2 is idle (e.g., virtual CS idle (e.g., NAV=0), PIFS CS idle, and/or a backoff timer is counting down to zero or is already zero), the AP MLD may transmit frame(s) over both link 1 and link 2 synchronously. Otherwise, in an event that the channel status of link 2 is not idle (e.g., virtual CS busy (e.g., NAV is not zero), PIFS CS busy, and/or a backoff timer is not zero or suspended due to channel busy), the AP MLD may transmit frame(s) on link 1 only. Under the third approach, when a backoff timer of the STA of the constrained AP MLD backs off to zero in a backoff procedure on link 2, the AP MLD may proceed differently depending on whether the channel status of link 1 is also idle. Specifically, in an event that the channel status of link 1 is idle (e.g., virtual CS idle (e.g., NAV=0), PIFS CS idle, and/or a backoff timer is counting down to zero or is already zero), the AP MLD may transmit frames over both link 1 and link 2 synchronously. Otherwise, in an event that the channel status of link 1 is not idle, the AP MLD may not transmit on either link 1 or link 2. In other words, the AP MLD may initiate a transmission on link2 (the secondary link) only in the event that the constrained AP MLD obtains a transmission opportunity on link1 (the primary link). Otherwise, the constrained AP MLD may not initiate a transmission on link2 (the secondary link) in the event that the constrained AP MLD does not obtain a transmission opportunity on link1 (the primary link).

Under a second proposed scheme in accordance with the present disclosure, a non-AP STA/MLD (e.g., STA 110, STA 115 or STA 125) associated with a constrained AP MLD (e.g., AP 120) may perform constrained multi-link operations as described below. By default, the AP MLD may allow legacy STAs and single-link extreme high-throughput (EHT) STAs, which are not capable of multi-link operations only operate on link 1 (e.g., legacy STAs and single-link EHT STAs are only allowed to associate with the AP of the AP MLD on link1 so that they will only operate on link1). When a given non-AP STA (e.g., STA110, a legacy STA or a single-link non-legacy STA) is a single-link device which can listen to only one link (e.g., link 1), it may perform a contention on the primary channel of link 1 (e.g., in a single-primary link mode). When a given non-AP MLD (e.g., STA 115 or STA 125) which can listen to more than one link, by default the non-AP MLD may perform channel contention on the primary channel of link 1, with link 1 being the primary link and link 2 being the secondary link. The non-AP MLD may perform channel contention independently on each primary channel of link 1 and link 2 (e.g., in a multiple-primary link mode).

Under the second proposed scheme, in case that the AP MLD is participating in a TXOP for frame exchange on link 1, the non-AP MLD may suspend the contention on both link 1 and link 2. After obtaining a TXOP (e.g., backoff to zero) on any of the links, the non-AP MLD may check channel status of the other link(s). In an event that the non-AP MLD obtains the TXOP on link 1, the non-AP MLD may check channel status of link 2. In case that the channel status of link 2 is idle (e.g., virtual CS idle (e.g., NAV=0), PIFS CS idle and/or backoff timer counting down to zero or is already zero), the non-AP MLD may transmit frame(s) over both link 1 and link 2 synchronously. In case that the channel status of link 2 is not idle, the non-AP MLD may transmit frame(s) on link 1 only. Likewise, in an event that the non-AP MLD obtains the TXOP on link 2, the non-AP MLD may check channel status of link 1. In case that the channel status of link 1 is idle (e.g., virtual CS idle (e.g., NAV=0), PIFS CS idle and/or backoff timer counting down to zero or is already zero), the non-AP MLD may transmit frame(s) over both link 1 and link 2 synchronously. In case that the channel status of link 1 is not idle, the non-AP MLD may proceed with either of a first approach (option 1) or a second approach (option 2). Under the first approach, the non-AP MLD may transmit frame(s) on link 2 only (e.g., if the channel status of link1 is not idle due to OBSS transmission). Under the second approach, the non-AP MLD may not transmit frames on either link 1 or link 2 (e.g., if the channel status of link1 is not idle due to the AP is participating a TXOP on link 1). In other words, the non-AP MLD (either constrained or non-constrained non-AP MLD) may initiate a transmission on link2 (the secondary link) only in the event that the non-AP MLD obtains a transmission opportunity on link1 (the primary link). Otherwise, the non-AP MLD may not initiate a transmission on link2 (the secondary link) in the event that the non-AP MLD does not obtain a transmission opportunity on link1 (the primary link). Under the second proposed scheme, in an event that the AP MLD disallows channel contention on link 2, the non-AP MLD may perform a contention only on the primary channel of link 1 (e.g., in a single-primary link mode).

Figure 6:
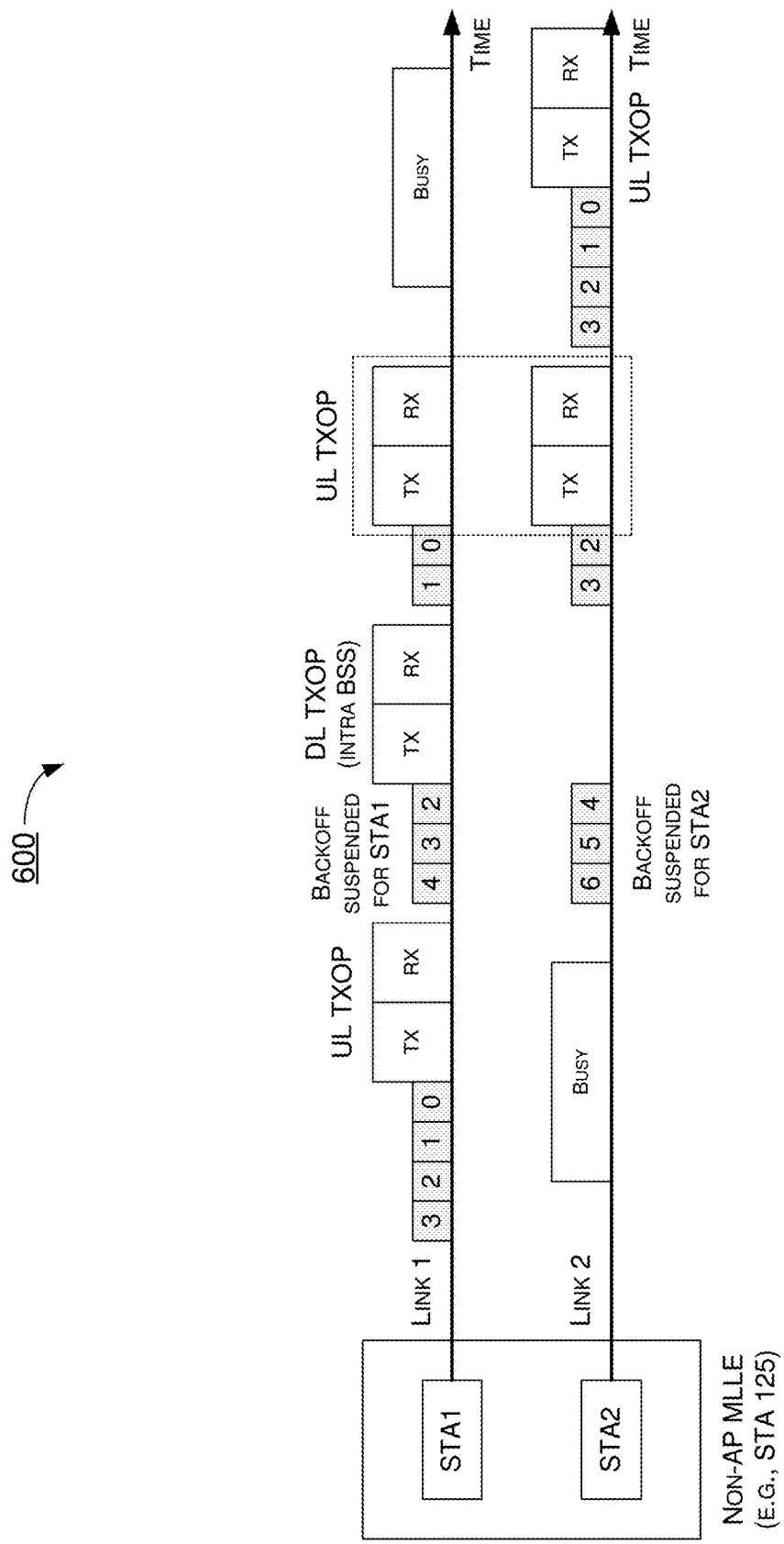
FIG. 6 is a diagram of an example scenario in accordance with the present disclosure.

FIG. 6 illustrates an example scenario 600 of a constrained MLD operation in accordance with the present disclosure. Scenario 600 shows an example implementation of the first approach of the second proposed scheme. Referring to FIG. 6, a non-AP MLD (e.g., STA 125, denoted as "STA1" and "STA2" in FIG. 6, which are the STAs of the non-AP MLD on link 1 and link 2, respectively) associated with a constrained AP MLD (e.g., AP 120) may suspend the contention on both link 1 and link 2 when the AP MLD participates in a TXOP (e.g., DL TXOP of intra basic service set (BSS), initiated with RTS/CTS frame exchange) for frame exchanges on link 1. When a backoff timer counts down to zero on link 1, the STA may obtain an UL TXOP to perform frame exchanges on both link 1 and link 2 if the channel status of link2 is idle (e.g., virtual CS idle (e.g., NAV=0), PIFS CS idle and/or backoff timer counting down to zero or is already zero). In case that the channel status of link 1 is not idle (e.g., being busy due to overlapping basic service set (OBSS) transmission or other system interference), when a backoff timer counts down to zero on link 2, the STA may obtain an UL TXOP to perform frame exchanges transmit on link 2.

Figure 7:
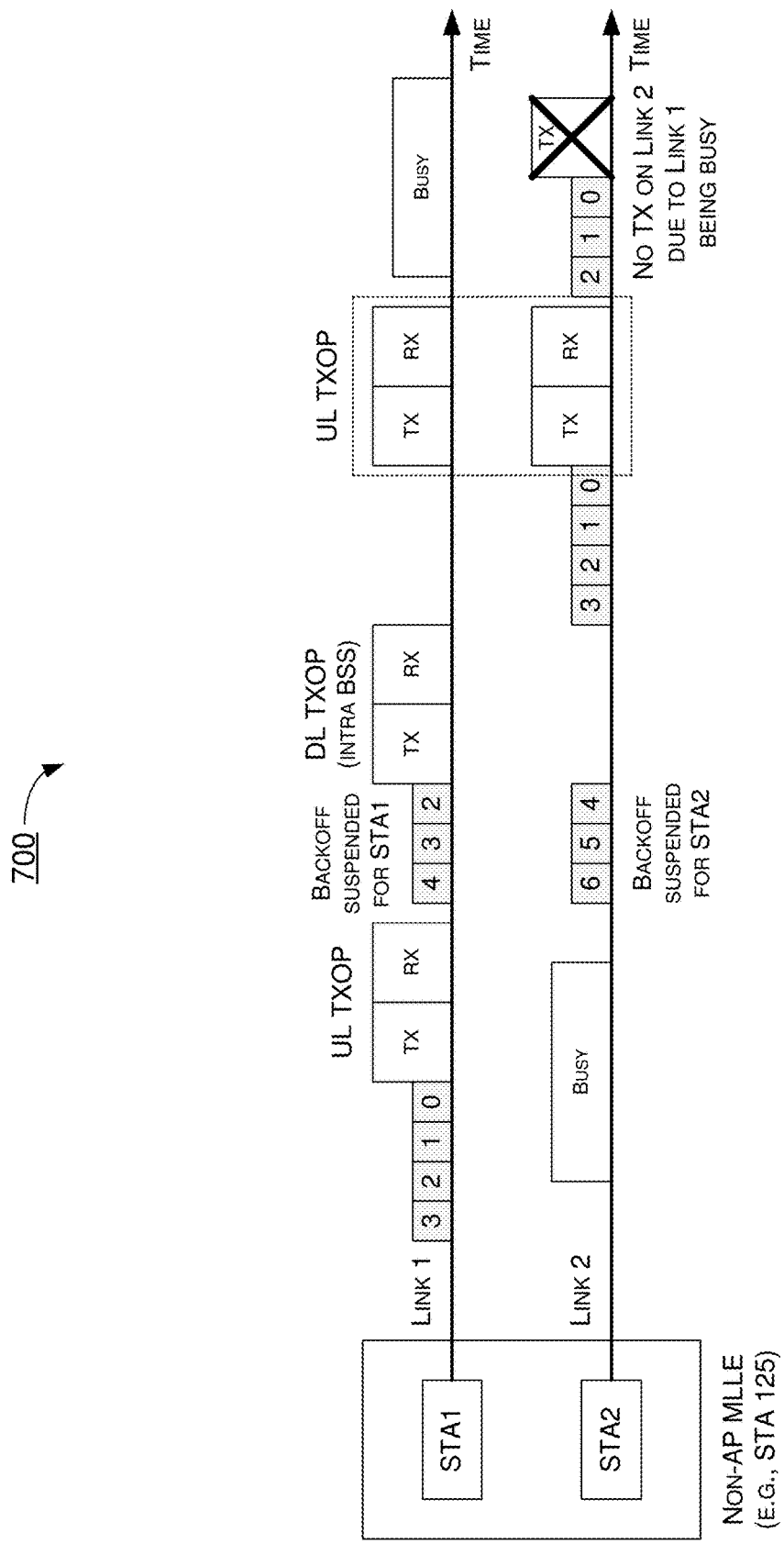
FIG. 7 is a diagram of an example scenario in accordance with the present disclosure.

FIG. 7 illustrates an example scenario 700 of a constrained MLD operation in accordance with the present disclosure. Scenario 700 shows an example implementation of the second approach of the second proposed scheme. Referring to FIG. 7, a non-AP MLD (e.g., STA 115 or STA 125, denoted as "STA1" on link1 and "STA2" on link2 in FIG. 7) associated with a constrained AP MLD (e.g., AP 120) may suspend the contention on both link 1 and link 2 when the AP MLD participates in a TXOP (e.g., DL TXOP of intra BSS) for frame exchanges on link 1. When a backoff timer counts down to zero on link 1, the STA may obtain an UL TXOP to perform frame exchanges on both link 1 and link 2 if the channel status of link2 is idle (e.g., virtual CS idle (e.g., NAV=0), PIFS CS idle and/or backoff timer counting down to zero or is already zero). When a backoff timer counts down to zero on link 2, in case that the channel status of link 1 is not idle (e.g., being busy), the STA may not transmit frames on either link 1 or link 2. In other words, the non-AP MLD (either constrained or non-constrained non-AP MLD) may initiate a transmission on link2 (the secondary link) only in the event that the non-AP MLD obtains a transmission opportunity on link1 (the primary link). Otherwise, the non-AP MLD may not initiate a transmission on link2 (the secondary link) in the event that the non-AP MLD does not obtain a transmission opportunity on link1 (the primary link).

Under a third proposed scheme in accordance with the present disclosure, a constrained/non-constrained non-AP MLD (e.g., STA 110, STA 115, STA 125) associated with a constrained AP MLD (e.g., AP 120), which supports multi-link operations but has an IDC interference, may maintain a reception network allocation vector (RXNAV) timer for each link and set the RXNAV timer when the MLD is a TXOP responder on the corresponding link. For instance, the RXNAV timer may be set or updated to a new value which is the value of the duration or identification (ID) field in the medium access control layer (MAC) header or TXOP_Duration field in a physical layer (PHY) header in a frame most recently received by the TXOP responder in case the new value of the RXNAV timer is greater than a current value. Under the third proposed scheme, in an event that the RXNAV timer corresponding to one link is not zero, then a backoff procedure on other link(s) may not be invoked or may be suspended if already invoked. Alternatively, in an event that a backoff timer on one link counts down to zero, an in case the RXNAV timer corresponding to other link(s) is not zero, then transmission on the link may be suspended or otherwise canceled.

Figure 8:
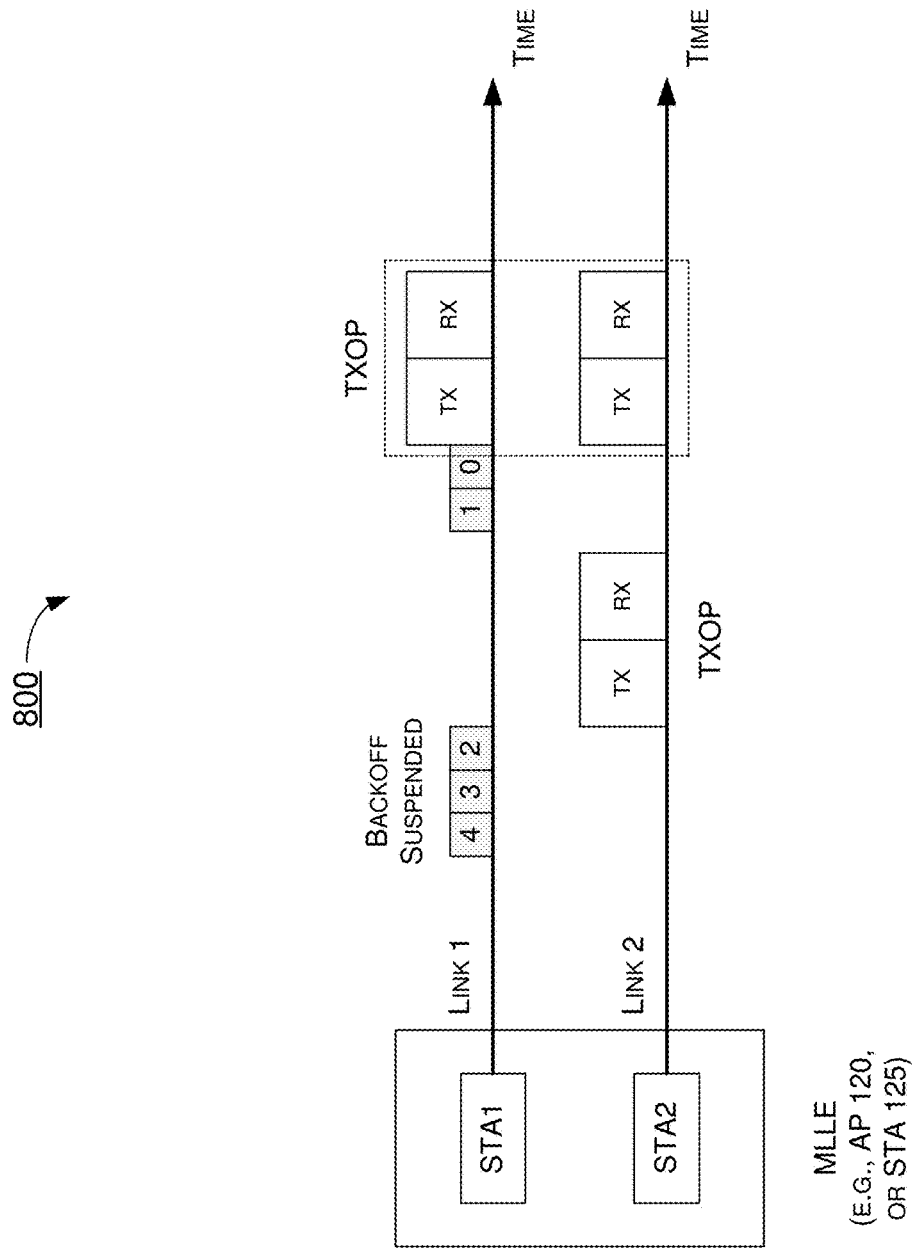
FIG. 8 is a diagram of an example scenario in accordance with the present disclosure.

FIG. 8 illustrates an example scenario 800 of a constrained MLD operation in accordance with the present disclosure. Scenario 800 shows an example implementation of the third proposed scheme. Referring to FIG. 8, an MLD (e.g., STA 125 or AP 120, denoted as "MLLE" in FIG. 8) may perform a backoff procedure on link 1, which may be related to the channel status of both link 1 and link 2. In scenario 800, when there is an ongoing TXOP for which STA2 (e.g., STA 115) of the MLD is the responder, STA2 may set its RXNAV timer to a value of the TXOP duration. Moreover, a backoff procedure of STA1 (e.g., STA 115) of the MLD on link 1 may be suspended in case the RXNAV timer of STA2 of the MLD is not zero. Furthermore, the backoff procedure of STA1 of the MLD on link 1 may be resumed when the RXNAV timer of STA2 of the MLD on link 2 counts down to zero.

Figure 9:
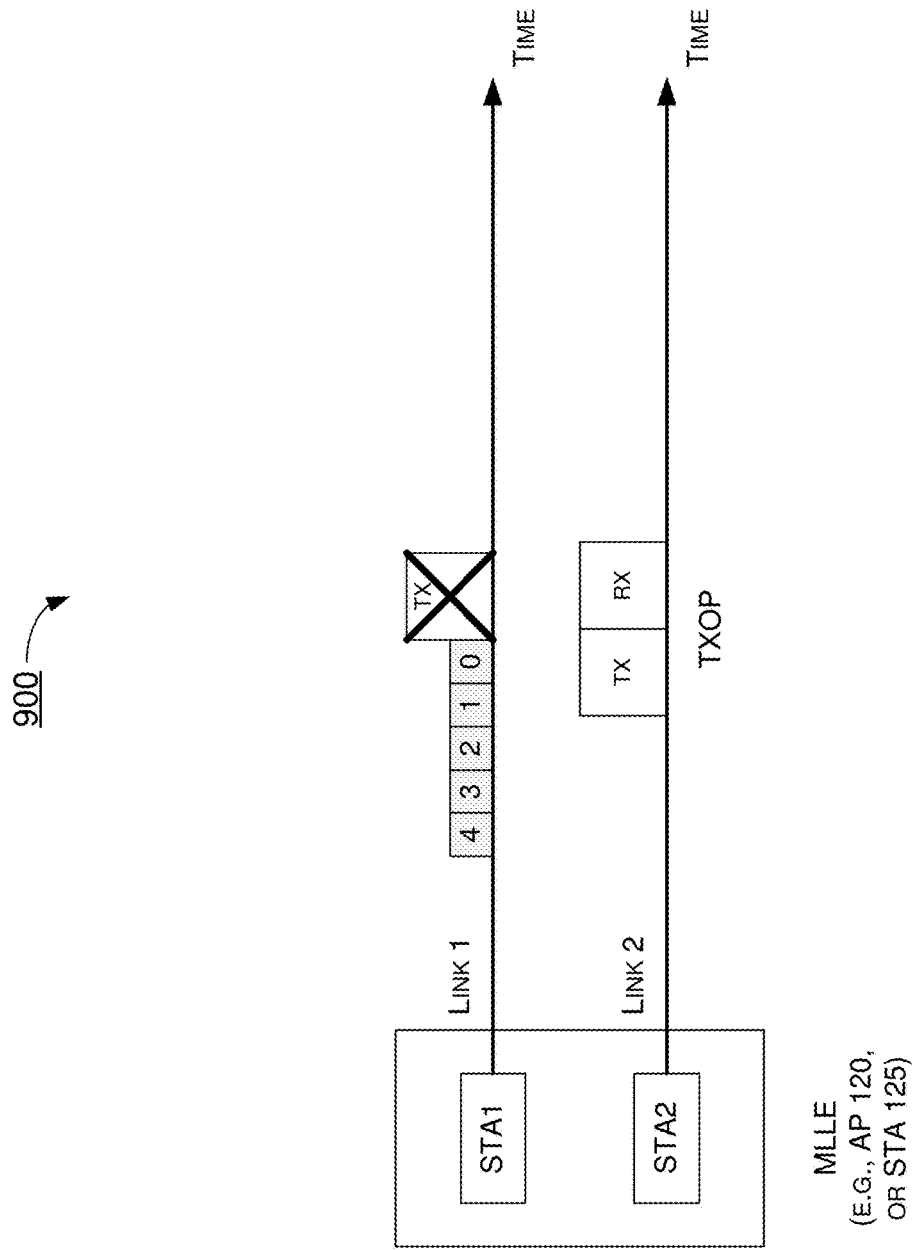
FIG. 9 is a diagram of an example scenario in accordance with the present disclosure.

FIG. 9 illustrates an example scenario 900 of a constrained MLD operation in accordance with the present disclosure. Scenario 900 shows an example implementation of the third proposed scheme. Referring to FIG. 9, an MLD (e.g., STA 125 or AP 120, denoted as "MLEE" in FIG. 9) may perform a backoff procedure on link 1, which may be related to the channel status of link 1 (but not link 2). In scenario 900, when there is an ongoing TXOP for which STA2 (e.g., STA 125) of the MLD is the responder, STA2 may set its RXNAV timer to a value of the TXOP duration. Moreover, a backoff procedure of STA1 (e.g., STA 115) of the MLD on link 1 may not be suspended in case the RXNAV timer of STA2 of the MLD is not zero. Furthermore, the backoff procedure of STA1 of the MLD on link 1 may be canceled when the backoff procedure counts down to zero because the RXNAV timer of STA2 is not zero.

Under a fourth proposed scheme in accordance with the present disclosure, a non-AP STA associated with a constrained AP MLD may operate as described below. By default, the AP MLD may signal a primary channel of link 1 to allow contention-based channel access, and legacy STAs as well as single-link EHT STA may operate on link 1. In an event that the non-AP STA is a single-link device which can listen to one (but not more than one) link (e.g., as a legacy STA or single-link non-legacy STA), the non-AP STA may perform a contention on the primary channel of link 1 (e.g., in a single-primary link mode). In an event that the non-AP STA is a non-AP MLD which can listen to more than one link, the non-AP STA may, by default, perform channel contention on the primary channel of link 1, with link 1 being the primary link and link 2 being the secondary link. In case that the AP MLD signals to allow contention-based access on link 2, the STA of the non-AP MLD may perform channel contention independently on the primary channel of each of link 1 and link 2 with the same initialized value or randomly different initialized value of backoff timers on each link. Contrarily, in case that the AP MLD disallows channel contention on link 2, the non-AP STA may perform a contention on the primary channel of link 1 (e.g., in a single-primary link mode). Moreover, in case that the AP MLD participates in a TXOP for frame exchange on link 1, the non-AP MLD may pause contention on both link 1 and link 2. After obtaining a TXOP (e.g., backoff to zero) on any of the links, the non-AP MLD may check channel status of the other link(s).

In an event that the non-AP MLD obtained a TXOP on link 1, the non-AP MLD may check the channel status of link 2. In response to the channel status of link 2 being idle (e.g., virtual CS idle, PIFS CS idle, and/or a backoff timer is zero or counting down to zero), the non-AP MLD may transmit frames over both link 1 and link 2 synchronously. In response to the channel status of link 2 being not idle, the non-AP MLD may transmit frames on link 1 (but not on link 2). In an event that the non-AP MLD obtained a TXOP on link 2, the non-AP MLD may check the channel status of link 1. In response to the channel status of link 1 being idle (e.g., virtual CS idle, PIFS CS idle, and/or a backoff timer is zero or counting down to zero), the non-AP MLD may transmit frames over both link 1 and link 2 synchronously. In response to the channel status of link 1 being not idle, there may be two options for the non-AP MLD. Under a first option, the non-AP MLD may transmit frames on link 2 (but not on link 1) (e.g., if the channel status of link 1 is busy due to OBSS transmission or other system interference). Under a second option, the non-AP MLD may not transmit any frame on either link 1 or link 2 (e.g., if the channel status of link 1 is busy due to intra BSS transmission).

Figure 10:
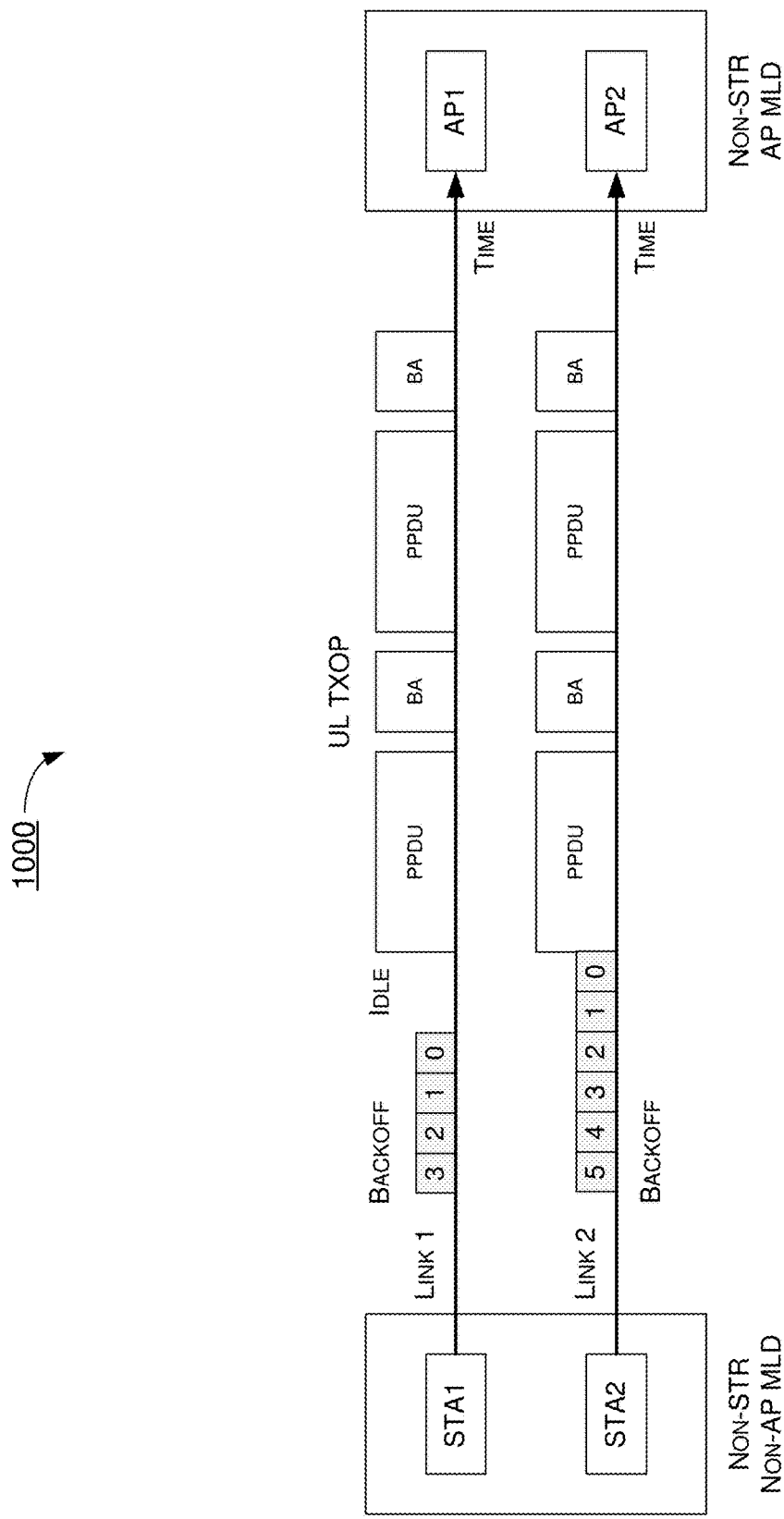
FIG. 10 is a diagram of an example scenario in accordance with the present disclosure.

FIG. 10 illustrates an example scenario 1000 of a constrained MLD operation in accordance with the present disclosure. Scenario 1000 shows an example implementation of the fourth proposed scheme in which synchronous transmission between a non-simultaneous transmit and receive (non-STR) AP MLD (a constrained AP MLD) and a non-STR non-AP MLD may be achieved by performing contention-based channel access on both the primary link and the secondary link. Specifically, FIG. 10 shows an example of UL synchronous transmissions on link 1 (primary link) and link 2 (secondary link). In scenario 1000, STA1 and STA2 are affiliated with a non-STR non-AP MLD, and AP1 and AP2 are affiliated with a non-STR AP MLD. For instance, STA1 and STA2 may be affiliated with the same non-STR non-AP MLD which is a TXOP initiator, and AP1 and AP2 may be affiliated with the same non-STR AP MLD which is a TXOP responder. In the example shown in FIG. 10, a non-AP MLD may also be an STR non-AP MLD.

In the example shown in FIG. 10, STA1 and STA2 start enhanced distributed channel access (EDCA) backoff procedures on the primary link and the secondary link separately. When a backoff timer of STA1 (e.g., random backoff (RBO)) counts down to zero first on the primary link, STA1 may obtain a TXOP and transmit frame(s) over the primary link. In an event that STA1 checks the channel status of STA2, if the backoff timer of STA2 (e.g., RBO) is not zero, STA1 may keep its backoff timer zero and wait for the backoff timer of STA2 to count down to zero on the secondary link. Then, STA1 and STA2 may start synchronous transmission of Physical Layer Convergence Procedure (PLCP) protocol data units (PPDUs) over the primary link and the secondary link when the backoff timer of STA2 counts down to zero and STA1 remains in an idle status (e.g., based on virtual CS being idle and/or physical CS being idle) on the primary link. Referring to FIG. 10, the end of PPUDs on the primary link and the secondary link may be required to be aligned. Additionally, the start of PPDU on the waiting link (which is the primary link in the example shown in FIG. 10) should be synchronous with the start of PPDU on the other link (which is the secondary link in the example shown in FIG. 10).

Figure 11:
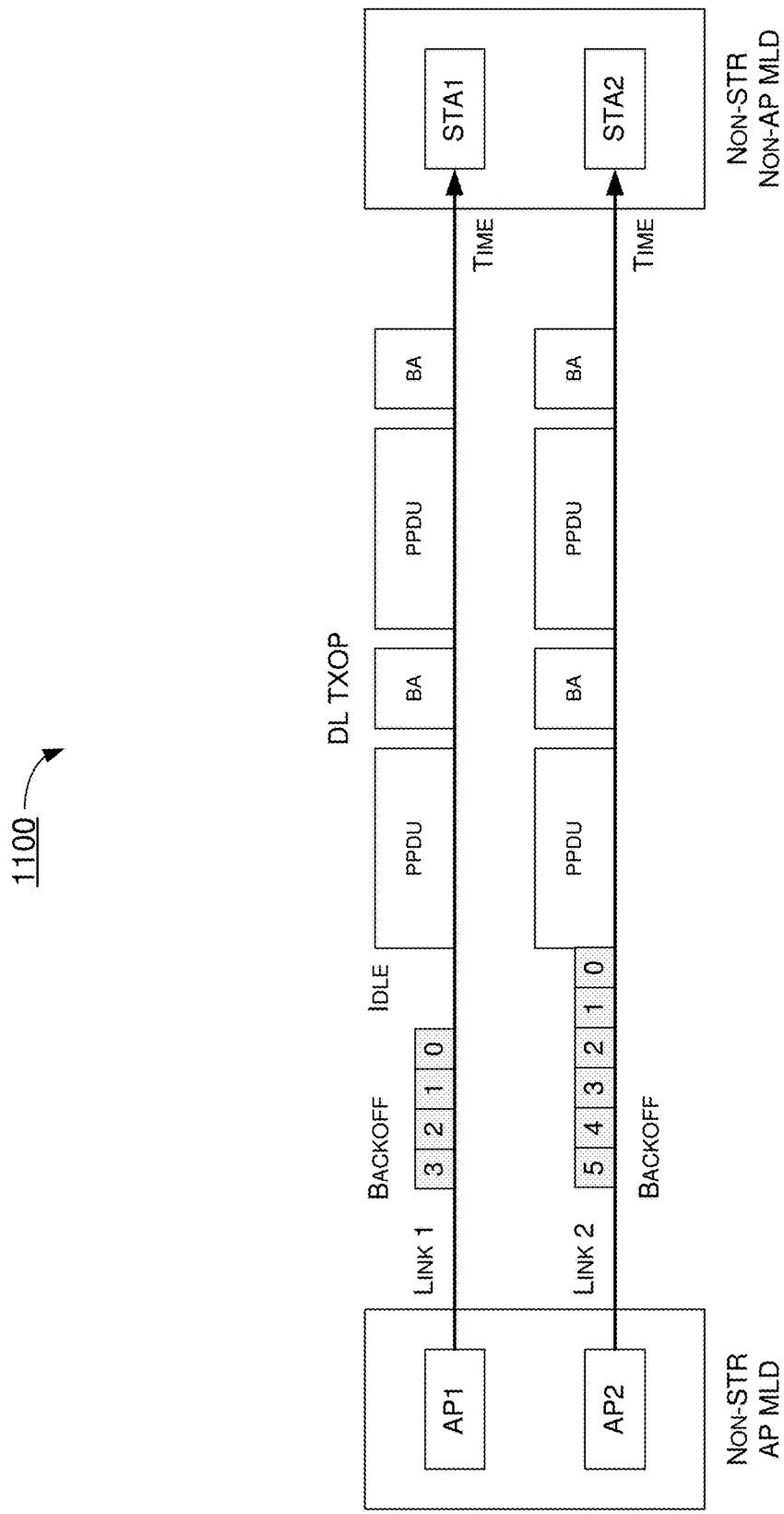
FIG. 11 is a diagram of an example scenario in accordance with the present disclosure.

FIG. 11 illustrates an example scenario 1100 of a constrained MLD operation in accordance with the present disclosure. Scenario 1100 shows an example implementation of the fourth proposed scheme in which synchronous transmission between a non-STR AP MLD and a non-STR non-AP MLD may be achieved by performing contention-based channel access on both the primary link and the secondary link. Specifically, FIG. 11 shows an example of DL synchronous transmissions on link 1 (primary link) and link 2 (secondary link). In scenario 1100, AP1 and AP2 are affiliated with a non-STR AP MLD, and STA1 and STA2 are affiliated with a non-STR non-AP MLD. In the example shown in FIG. 11, a non-AP MLD may also be a STR non-AP MLD or, alternatively, STA1 and STA2 may be two different devices not affiliated with the same MLD. For instance, AP1 and AP2 may be affiliated with the same non-STR AP MLD which is a TXOP initiator, and STA1 and STA2 may be affiliated with the same non-STR non-AP MLD which is a TXOP responder.

In the example shown in FIGS. 11, AP1 and AP2 start EDCA backoff procedures on the primary link and the secondary link separately. When a backoff timer of AP1 (e.g., RBO) counts down to zero first on the primary link, AP1 may obtain a TXOP and transmit frame(s) over the primary link. In an event that AP1 checks the channel status of AP2, if the backoff timer of AP2 (e.g., RBO) is not zero, AP1 may keep its backoff timer zero on the primary link and wait for the backoff timer of AP2 to count down to zero on the secondary link. Then, AP1 and AP2 may start synchronous transmission of PPDUs over the primary link and the secondary link when the backoff timer of AP2 counts down to zero and AP1 remains in an idle status (e.g., based on virtual CS being idle and/or physical CS being idle). Referring to FIG. 11, the end of PPUDs on the primary link and the secondary link may be required to be aligned. Additionally, the start of PPDU on the waiting link (which is the primary link in the example shown in FIG. 11) should be synchronous with the start of PPDU on the other link (which is the secondary link in the example shown in FIG. 11). In the example shown in FIG. 11, a non-AP MLD may also be an STR non-AP MLD.

Figure 12:
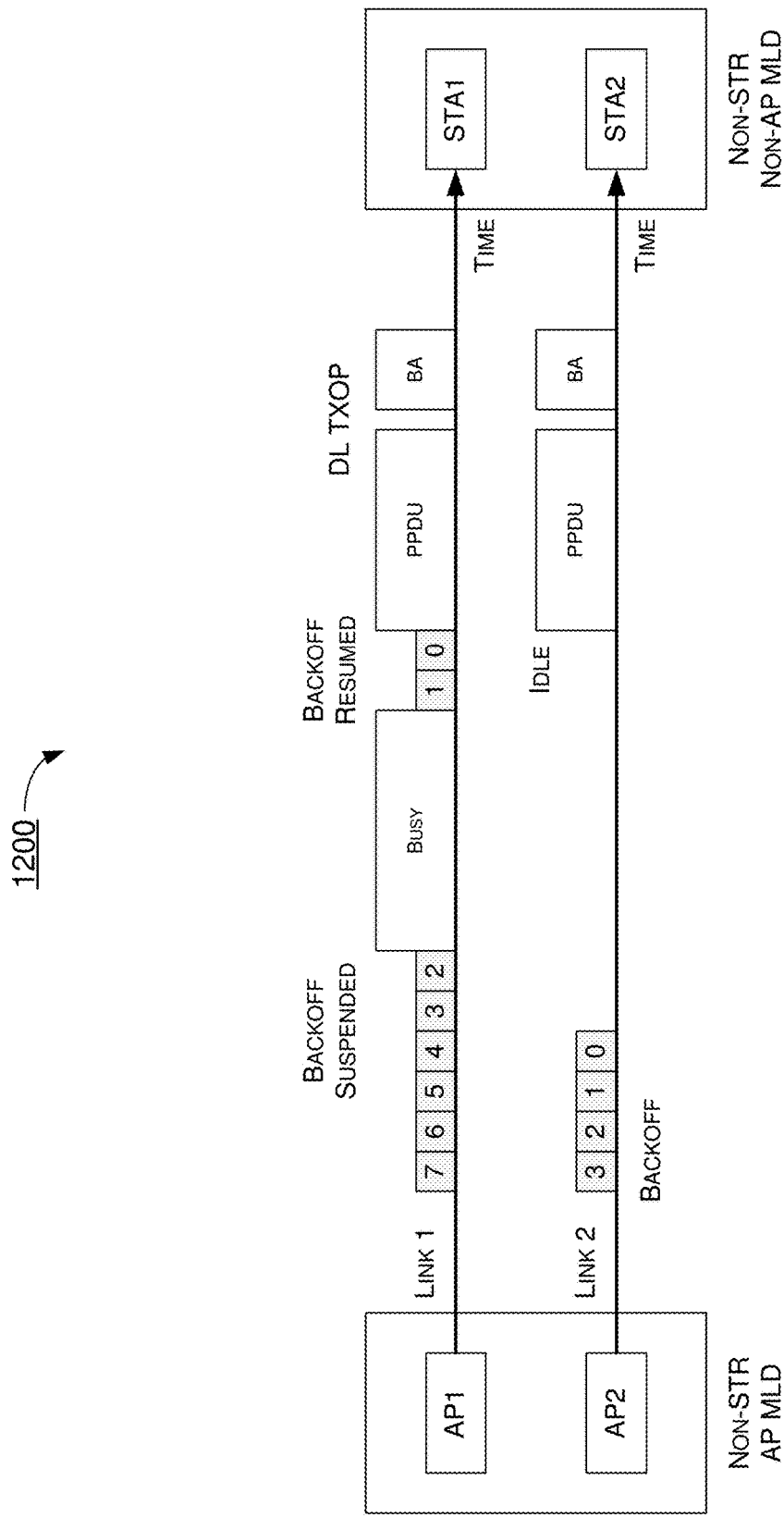
FIG. 12 is a diagram of an example scenario in accordance with the present disclosure.

FIG. 12 illustrates an example scenario 1200 of a constrained MLD operation in accordance with the present disclosure. Scenario 1200 shows an example implementation of the fourth proposed scheme in which synchronous transmission between a non-STR non-AP MLD and a non-STR AP MLD may be achieved by performing contention-based channel access on both the primary link and the secondary link. Specifically, FIG. 12 shows an example of a DL TXOP for synchronous transmissions on link 1 (primary link) and link 2 (secondary link). In scenario 1200, AP1 and AP2 are affiliated with a non-STR AP MLD, and STA1 and STA2 are affiliated with a non-STR non-AP MLD. For instance, AP1 and AP2 may be affiliated with the same non-STR AP MLD which is a TXOP initiator, and STA1 and STA2 may be affiliated with the same non-STR non-AP MLD which is a TXOP responder. In the example shown in FIG. 12, a non-AP MLD may also be an STR non-AP MLD.

In the example shown in FIG. 12, channel access procedures may follow the same rules as in scenario 1100 of FIG. 11 for DL synchronous transmission with the constraints that AP2 may initiate a transmission on the secondary link only while AP1 obtains a TXOP on the primary link, even in the event of a backoff timer of AP2 (e.g., RBO) counting down to zero first on the secondary link. In the example shown in FIG. 12, since channel status on the primary link is busy when the backoff timer of AP2 counts down to zero, AP2 may not initiate a transmission on the secondary link only. AP2 may keep the backoff timer zero and wait for channel status of AP1 to become idle. Referring to FIG. 12, while waiting for its backoff timer (e.g., RBO) of AP1 counting down to zero, the backoff of AP1 may be suspended because of channel status being busy (e.g., due to overlapping basic service set (OBSS) being busy or other system interference) and, accordingly, AP2 may not transmit on the secondary link when the primary link is busy. When the backoff timer of AP1 resumes to count down to zero, AP1 and AP2 may synchronously transmit on both the primary link and the secondary link in case the secondary link is idle. Referring to FIG. 12, the end of PPUDs on the primary link and the secondary link may be required to be aligned. Additionally, the start of PPDU on the waiting link (which is the secondary link in the example shown in FIG. 12) should be synchronous with the start of PPDU on the other link (which is the primary link in the example shown in FIG. 12).

Figure 13:
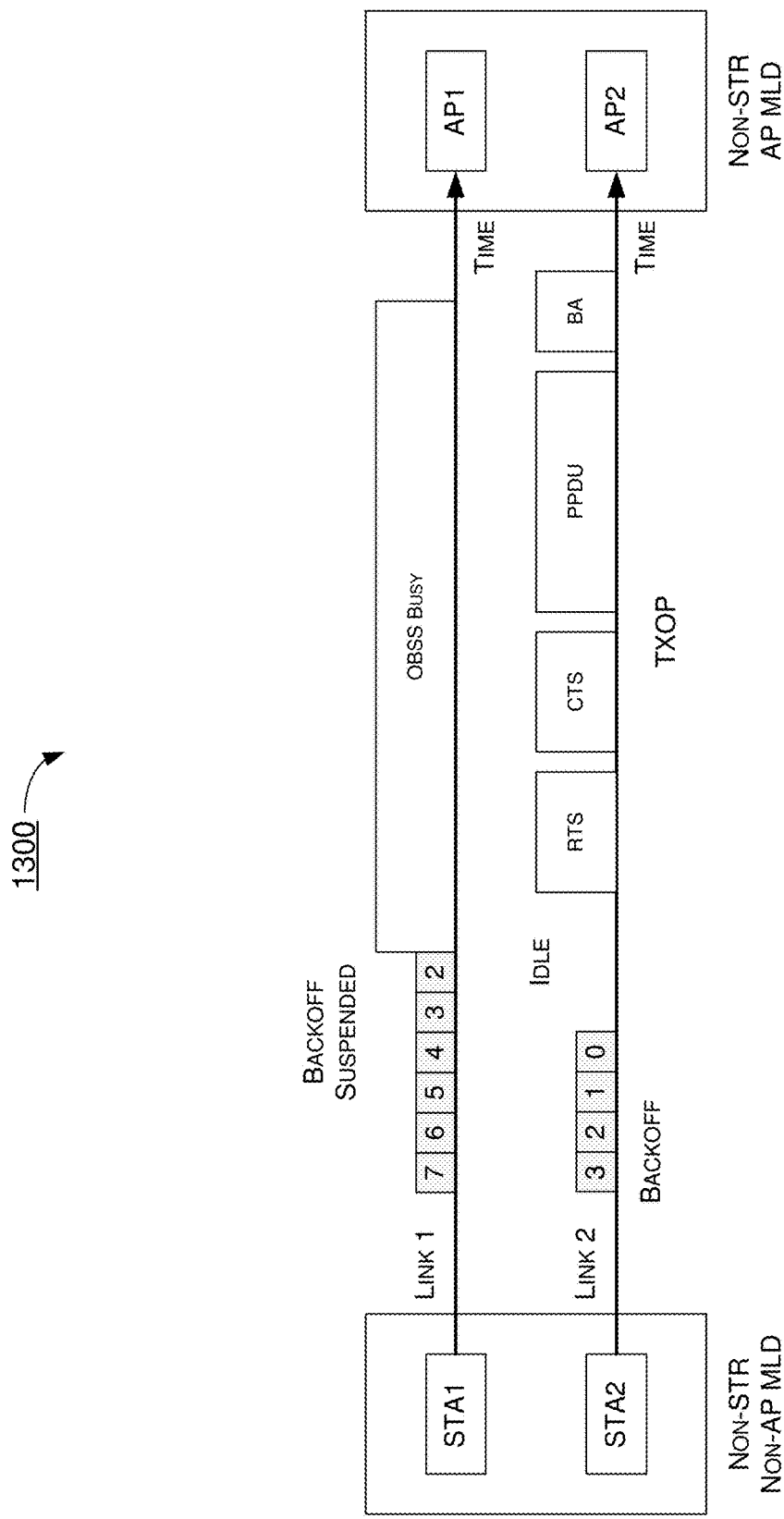
FIG. 13 is a diagram of an example scenario in accordance with the present disclosure.

FIG. 13 illustrates an example scenario 1300 of a constrained MLD operation in accordance with the present disclosure. Scenario 1300 shows an example implementation of the fourth proposed scheme in which synchronous transmission between a non-STR non-AP MLD and a non-STR AP MLD may be achieved by performing contention-based channel access on both the primary link and the secondary link. Specifically, FIG. 13 shows an example of an UL TXOP for synchronous transmissions on link 1 (primary link) and link 2 (secondary link). In scenario 1300, STA1 and STA2 are affiliated with a non-STR non-AP MLD, and AP1 and AP2 are affiliated with a non-STR AP MLD. In the example shown in FIG. 13, a non-AP MLD may also be a STR non-AP MLD. For instance, STA1 and STA2 may be affiliated with the same non-STR non-AP MLD which is a TXOP initiator, and AP1 and AP2 may be affiliated with the same non-STR AP MLD which is a TXOP responder.

In the example shown in FIG. 13, a backoff timer of STA2 (e.g., RBO) counts down to zero on the secondary link first. In an event that contention-based channel access only on the secondary link is allowed under at least one of the conditions, for example and not limited to: (1) TXOP transmission on the secondary link must begin with a special control frame to request the transmission; (2) the primary link is busy due to OBSS transmission or other system interference; (3) the TXOP transmission on the primary link must begin with a special control frame to request the transmission, while STA2 waiting for backoff timer (e.g., RBO) of STA1 to count down to zero, STA1 may suspend the backoff procedure due to the channel status of the primary link being busy. Accordingly, STA2 may initiate a TXOP starting with successful request-to-send (RTS) and clear-to-send (CTS) frame exchange on the secondary link. For instance, when the backoff timer of STA2 reaches zero, STA2 may initiate a TXOP starting with successful RTS and CTS frame exchange on the secondary link without waiting for the backoff timer of STA1 to reach zero. AP2, as a responder, may respond to the RTS based on at least one of a number of conditions including, for example and not limited to: (1) AP1 having detected the primary link being busy based on virtual CS and/or physical CS being idle (e.g., OBSS transmission, non-zero basic network allocation vector (NAV) set by OBSS, or energy detection of Wi-Fi or non-Wi-Fi signal; (2) AP2 having detected the secondary link being idle based on virtual CS and physical CS; and (3) AP1 is not participating a TXOP. The TXOP duration on the secondary link may be limited by one of the following pieces of information: OBSS PPDU length, OBSS TXOP duration on the primary link, channel occupancy of other unlicensed system on the primary link (e.g., a New Radio Unlicensed (NR-U) system), and one or more data frame exchange(s) (e.g., RTS plus CTS plus one or more PPDUs and block acknowledgements (BAs). It is noteworthy that the same rules described above may be applied vice versa on the primary link when a backoff timer of STA1 (e.g., RBO) counts down to zero on the primary link first (before the backoff timer of STA2 counts down to zero on the secondary link). Moreover, in the example shown in FIG. 13, the TXOP initiator may also be the non-STR AP MLD and, in such cases, description above regarding the non-STR non-AP MLD being a TXOP initiator may also be applied to the non-STR AP MLD as the TXOP initiator.

In the example shown in FIG. 13, at the end of the TXOP on the secondary link, STA1 affiliated with the same non-STR non-AP MLD as STA2 may not transmit on the primary link until its NAV on the primary link is updated or after a maximum PPDU length of time, whichever occurs first. At the end of the TXOP on the secondary link, AP1 affiliated with the same non-STR AP MLD as AP2 may transmit on the primary link with at least one of a number of restrictions, unless the NAV of AP1 on the primary link is updated or after a maximum PPDU length of time, whichever occurs first. The restrictions may include, for example and without limitation: (1) AP1 is not to transmit to STA1 which is affiliated with the non-STR non-AP MLD participating in the TXOP on the secondary link; (2) AP1 is to start transmission with RTS/CTS; (3) AP1 is to use reduced energy detection (ED) threshold to perform EDCA backoff; and (4)

there is a limited number of frame exchanges or TXOPs. It is noteworthy that, in scenario 1300, the TXOP initiator may be the non-STR AP MLD or the non-STR non-AP MLD.

Under a fifth proposed scheme in accordance with the present disclosure, a multi-link AP device (herein interchangeably referred to as AP MLD) may operate on multiple links. A given pair of link may be referred to as a non-STR link pair in case simultaneous transmission on one link and reception on the other link are not supported due to IDC interference. When the AP MLD has at least one non-STR link pair, the AP MLD may be referred to as a non-STR AP MLD and it may designate one link of the non-STR link pair as a primary link and the other link of the non-STR link pair as a corresponding secondary link of the designated primary link.

Under the proposed scheme, when the AP MLD has more than one non-STR link pairs, the AP MLD may group the multiple links into different sets, namely: a primary link set and a secondary link set. One or more links of the AP MLD may be in the primary link set. In case there are multiple links in the primary link set, every pair of links in the primary link set may operate as an STR link pair. Moreover, any link of the AP MLD that is not in the primary link set may be in the secondary link set.

Under the proposed scheme, a link may be designated as a primary link in an event that it operates as an STR link pair with any other link of the AP MLD. In such cases, the designated primary link may have no corresponding secondary link. Additionally, a link may be designated as a primary link in an event that it operates as a non-STR link pair with at least one other link of the AP MLD. In such cases, the designated primary link may have one or more corresponding secondary links. Moreover, any link that operates as a non-STR link pair with a designated primary link may be the corresponding secondary link of that designated primary link. Furthermore, any link that operates as a non-STR link pair with a corresponding secondary link of a designated primary link may also be a corresponding secondary link of that designated primary link. Also, a secondary link may have one, and no more than one, designated primary link.

As an illustrative example, a non-STR AP MLD may operate on a set of links which are on the 2.4 GHz band, 5 GHz-band and 6 GHz band, respectively, denoted as {2.4 GHz link, 5 GHz link, 6 GHz linek}. The 2.4 GHz link may have no IDC interference with the other two links, and thus the 2.4 GHz link may be designated as a primary link with no secondary link. The 5 GHz link may have IDC interference with the 6 GHz link, and vice versa, and thus either one of the 5 GHz link and the 6 GHz link may be designated as a primary link with the other link being the corresponding secondary link.

As another illustrative example, a non-STR AP MLD may operate on a set of links which are on the 5 GHz-band and 6 GHz band, respectively, denoted as {5 GHz link, 6 GHz link 1, 6 GHz link 2}. The 5 GHz link and the 6 GHZ link 1 may be a non-STR link pair. The 6 GHz link 1 and the 6 GHz link 2 may be another non-STR link pair. The non-STR AP MLD may designate the 5 GHz link as a primary link and the other two links as the corresponding secondary links of the primary link.

Under the proposed scheme, a non-STR AP MLD may determine the primary link (or primary link set) and the corresponding secondary link (or secondary link set), and the non-STR AP MLD may indicate the primary link (or primary link set) and non-STR link pair(s) in one or more management frames such as, for example and without limitation, beacon frames and probe response frames. Under the proposed scheme, when a non-AP MLD receives the indication of the primary link (or primary link set) and non-STR link pair(s) from the non-STR AP MLD, the non-AP MLD may determine the corresponding secondary link(s) for each primary link based on the non-STR link pair(s) indicated in the received multi-link element. The link indicated in a non-STR link pair with another link which is a designated primary link may be the corresponding secondary link of the primary link. The link indicated in a non-STR link pair with another link which is a corresponding secondary link of a primary link may also be the corresponding secondary link of that primary link.

Under the proposed scheme, a non-STR AP MLD may determine the primary link (or primary link set) and corresponding secondary link (or secondary link set), and the non-STR AP MLD may indicate the primary link (or primary link set) and corresponding secondary link(s) for each primary link in one or more management frames such as, for example and without limitation, beacon frames and probe response frames. Under the proposed scheme, when a non-AP MLD receives the indication of the primary link (or primary link set) and the corresponding secondary link(s) from the non-STR AP MLD, the non-AP MLD may determine the primary link(s) and the corresponding secondary link(s) for each primary link indicated in the received multi-link element.

Under the proposed scheme, a non-STR AP MLD may prevent legacy STAs and/or single-link STAs from attempting associations on a secondary link. For instance, the non-STR AP MLD may transmit one or more management frames (e.g., beacon frame(s) and/or probe response frame(s)) on a secondary link. Alternatively, or additionally, the non-STR AP MLD may transmit one or more management frames (e.g., beacon frame(s) and/or probe response frame(s)) indicating appropriate BSS membership selector and/or basic rate set values on a secondary link. The appropriate BSS membership selector and/or basic rate set values may not allow any STA to associate to the AP on the secondary link or may only allow non-AP MLD to associate to the AP on the secondary link. Alternatively, or additionally, the non-STR AP MLD may transmit one or more management frames (e.g., beacon frame(s) and/or probe response frame(s)) only on a primary link but not on a secondary link and, accordingly, no STAs/MLDs may associate with the AP of the non-STR AP MLD to or camp on the secondary link (as the secondary link in such case, as a secondary or conditional link, cannot be discovered; besides, a non-AP MLD performs multi-link level association with the non-STR AP MLD through the primary link).

Illustrative Implementations

Figure 14:
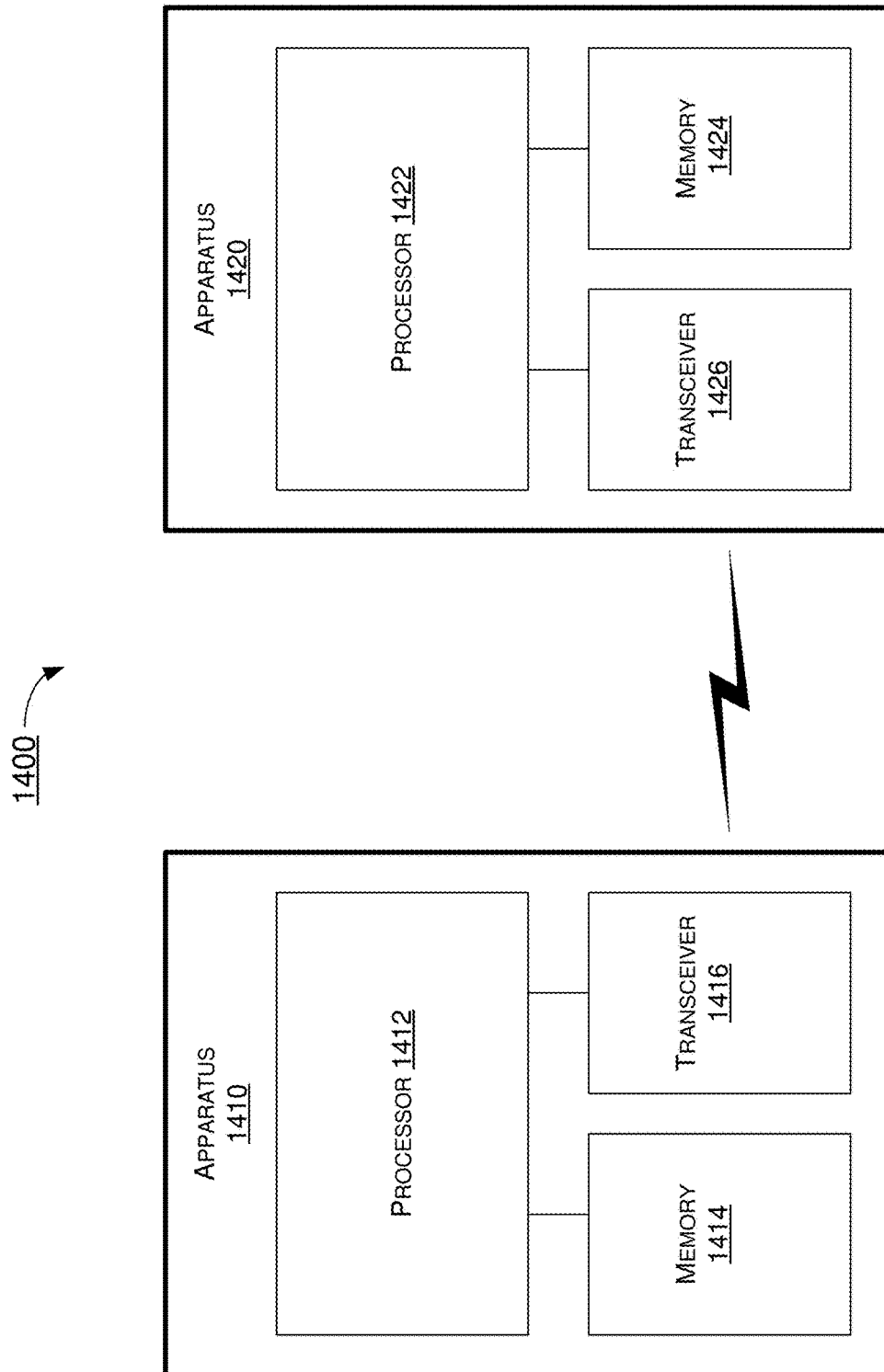
FIG. 14 is a block diagram of an example communication system in accordance with an implementation of the present disclosure.

FIG. 14 illustrates an example system 1400 having at least an example apparatus 1410 and an example apparatus 1420 in accordance with an implementation of the present disclosure. Each of apparatus 1410 and apparatus 1420 may perform various functions to implement schemes, techniques, processes and methods described herein pertaining to constrained multi-link device operations in wireless communications, including the various schemes described above with respect to various proposed designs, concepts, schemes, systems and methods described above as well as processes described below. For instance, apparatus 1410 may be implemented in STA 110 or STA 115 and apparatus 1420 may be implemented in AP 120 or STA 125, or vice versa.

Each of apparatus 1410 and apparatus 1420 may be a part of an electronic apparatus, which may be a STA or an AP, such as a portable or mobile apparatus, a wearable apparatus, a wireless communication apparatus or a computing apparatus. When implemented in a STA, each of apparatus 1410 and apparatus 1420 may be implemented in a smartphone, a smart watch, a personal digital assistant, a digital camera, or a computing equipment such as a tablet computer, a laptop computer or a notebook computer. Each of apparatus 1410 and apparatus 1420 may also be a part of a machine type apparatus, which may be an IoT apparatus such as an immobile or a stationary apparatus, a home apparatus, a wire communication apparatus or a computing apparatus. For instance, each of apparatus 1410 and apparatus 1420 may be implemented in a smart thermostat, a smart fridge, a smart door lock, a wireless speaker or a home control center. When implemented in or as a network apparatus, apparatus 1410 and/or apparatus 1420 may be implemented in a network node, such as an AP in a WLAN.

In some implementations, each of apparatus 1410 and apparatus 1420 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 1410 and apparatus 1420 may be implemented in or as a STA or an AP. Each of apparatus 1410 and apparatus 1420 may include at least some of those components shown in FIG. 14 such as a processor 1412 and a processor 1422, respectively, for example. Each of apparatus 1410 and apparatus 1420 may further include one or more other components not pertinent to the proposed scheme of the present disclosure (e.g., internal power supply, display device and/or user interface device), and, thus, such component(s) of apparatus 1410 and apparatus 1420 are neither shown in FIG. 14 nor described below in the interest of simplicity and brevity.

In one aspect, each of processor 1412 and processor 1422 may be implemented in the form of one or more single-core processors, one or more multi-core processors, one or more RISC processors or one or more CISC processors. That is, even though a singular term "a processor" is used herein to refer to processor 1412 and processor 1422, each of processor 1412 and processor 1422 may include multiple processors in some implementations and a single processor in other implementations in accordance with the present disclosure. In another aspect, each of processor 1412 and processor 1422 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1412 and processor 1422 is a special-purpose machine specifically designed, arranged and configured to perform specific tasks including those pertaining to constrained multi-link device operations in wireless communications in accordance with various implementations of the present disclosure.

In some implementations, apparatus 1410 may also include a transceiver 1416 coupled to processor 1412. Transceiver 1416 may include a transmitter capable of wirelessly transmitting and a receiver capable of wirelessly receiving data. In some implementations, apparatus 1420 may also include a transceiver 1426 coupled to processor 1422. Transceiver 1426 may include a transmitter capable of wirelessly transmitting and a receiver capable of wirelessly receiving data.

In some implementations, apparatus 1410 may further include a memory 1414 coupled to processor 1412 and capable of being accessed by processor 1412 and storing data therein. In some implementations, apparatus 1420 may further include a memory 1424 coupled to processor 1422 and capable of being accessed by processor 1422 and storing data therein. Each of memory 1414 and memory 1424 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1414 and memory 1424 may include a type of read-only memory (ROM) such as mask ROM, programmable ROM (PROM), erasable programmable ROM (EPROM) and/or electrically erasable programmable ROM (EEPROM). Alternatively, or additionally, each of memory 1414 and memory 1424 may include a type of non-volatile random-access memory (NVRAM) such as flash memory, solid-state memory, ferroelectric RAM (FeRAM), magnetoresistive RAM (MRAM) and/or phase-change memory.

Each of apparatus 1410 and apparatus 1420 may be a communication entity capable of communicating with each other using various proposed schemes in accordance with the present disclosure. For illustrative purposes and without limitation, a description of capabilities of apparatus 1410, as STA 110 (STA1), STA 115 (STA2), STA 125 or AP 120, and apparatus 1420, as another of STA 110 (STA1), STA 115 (STA2), STA 125 or AP 120, is provided below. It is noteworthy that, although the example implementations described below are provided in the context of WLAN, the same may be implemented in other types of networks.

Under a proposed scheme pertaining to constrained multi-link device operations in wireless communications in accordance with the present disclosure, processor 1412 of apparatus 1410 may monitor, via transceiver 1416, each of a first link and a second link in a multi-link operation in wireless communications, with the first link being a primary link and the second link being a secondary link. Additionally, processor 1412 may obtain a TXOP on one of the first link and the second link as a result of performing a contention-based channel access on the first link and the second link. Moreover, processor 1412 may check, via transceiver 1416, channel status of the other of the first link and the second link. Furthermore, processor 1412 may transmit, via the transceiver, one or more frames on the first link but not on the second link, on the second link but not on the first link, or on both the first link and the second link synchronously responsive to the channel status of the other link given the TXOP being obtained on the one of the first link and the second link.

In some implementations, responsive to the TXOP being obtained on the first link, in checking the channel status processor 1412 may check channel status of the second link. Additionally, responsive to the channel status of the second link being idle, processor 1412 may transmit one or more frames on both the first link and the second link synchronously. Moreover, responsive to the channel status of the second link being not idle, processor 1412 may transmit one or more frames on the first link but not on the second link.

In some implementations, responsive to the channel status of the second link being not idle, in transmitting the one or more frames on the first link but not on the second link, processor 1412 may performing one of the following: (a) transmit request to send (RTS) and receiving a clear to send (CTS) before data frame exchange; (b) restart a backoff timer on the first link with a random selected initial value or the current value of the backoff timer on the second link; or (c) initiating transmission when the second link is determined to be not idle.

In some implementations, responsive to the TXOP being obtained on the second link, in checking the channel status processor 1412 may check channel status of the first link. Additionally, responsive to the channel status of the first link being idle, processor 1412 may also transmit one or more frames on both the first link and the second link synchronously. Moreover, responsive to the channel status of the first link being not idle, processor 1412 may not transmit any frame on either the first link or the second link.

In some implementations, responsive to the TXOP being obtained on the second link, in checking the channel status processor 1412 may check channel status of the first link. Moreover, responsive to the channel status of the first link being not idle, processor 1412 may transmit one or more frames on the second link but not on the first link.

In some implementations, responsive to the channel status of the first link being not idle, in transmitting the one or more frames on the second link but not on the first link process processor 1412 may perform at least one of: (a) transmitting an RTS and receiving a CTS before data frame exchange; and (b) receiving an indication from an AP MLD regarding whether the contention-based channel access on the second link only is allowed.

In some implementations, in checking the channel status of the other link processor 1412 may determine that the channel status of the other link is idle responsive to a virtual CS being idle, a PIFS CS being idle, a backoff timer for the other link being zero or counting down to zero, or a combination thereof.

In some implementations, responsive to the TXOP being obtained on one link of the first link and the second link, in checking the channel status of the other link, processor 1412 may performing operations including: (a) waiting for the backoff timer of the other link with a non-zero value to count down to zero and determining the channel status of the other link as idle when the backoff timer reaches zero; or (b) determining the channel of the other link as busy (e.g., responsive to the backoff timer of the other link having a non-zero value, NAV is not zero, and/or CCA busy).

In some implementations, the first link may be a primary link and the second link may be a secondary link. In such cases, the primary link may be configured or signaled to allow at least legacy STAs, single-link STAs, and STAs capable of multi-link operation to operate thereon. Moreover, the secondary link may be configured or signaled to disallow the at least legacy STAs and the single-link STAs to operate thereon.

In some implementations, responsive to the first link being a primary link and the second link being a secondary link, processor 1412 may transmit, via transceiver 1416, system information in one or more management frames on the primary link but not on the secondary link. Alternatively, processor 1412 may transmit, via transceiver 1416, system information in the one or more management frames to limit association attempts from legacy STAs and single-link STAs on the secondary link.

In some implementations, responsive to the first link being a primary link and the second link being a secondary link, the primary link may be signaled in system information transmitted by an AP in one or more management frames.

In some implementations, the first link may be a primary link and the second link may be a secondary link. In such cases, the primary link may have zero or one or more secondary links. Moreover, the secondary link may have one and no more than one corresponding primary link.

Under another proposed scheme pertaining to constrained multi-link device operations in wireless communications in accordance with the present disclosure, processor 1412 of apparatus 1410 may maintain a respective backoff timer for each of a first link and a second link in a multi-link operation in wireless communications. Additionally, processor 1412 may determine whether to participate in a TXOP on either of the first link and the second link either upon the respective backoff timer counting down to zero or upon receiving a request to send or a data frame. Moreover, processor 1412 may suspend channel access on the other link of the first link and the second link responsive to determining to participate in the TXOP on one of the first link and the second link.

In some implementations, in suspending the channel access on the other link of the first link and the second link responsive to determining to participate in the TXOP on one of the first link and the second link, processor 1412 may either: (a) suspend or not invoking the respective backoff timer on the other link of the first link and the second link; or (b) count down the respective backoff timer to zero but suspending or canceling a transmission on the other link of the first link and the second link responsive to the respective backoff timer for the other of the first link and the second link being non-zero.

In some implementations, processor 1412 may participate in the TXOP as a TXOP responder by receiving an RTS or a data frame. Alternatively, processor 1412 may also initiate the TXOP as a TXOP holder by sending an RTS or a data frame responsive to the respective backoff timer counting down to zero.

Under another proposed scheme pertaining to constrained multi-link device operations in wireless communications in accordance with the present disclosure, with apparatus 1410 implemented in or as AP 120 and apparatus 1420 implemented in or as STA 125 or STA 115 of a wireless network such as a WLAN in network environment 140 in accordance with one or more of IEEE 802.11 standards, processor 1412 of apparatus 1410 may perform a backoff procedure to count down to zero on a first link in a multi-link operation in wireless communications. Additionally, processor 1412 may determine whether channel status of the first link is still idle when one other backoff procedure counts down to zero on a second link in the multi-link operation. Moreover, processor 1412 may perform, via transceiver 1416, a transmission on the first link synchronously with another transmission on the second ink responsive to determining that the channel status of the first link is still idle when the other backoff procedure counts down to zero on the second link.

In some implementations, the first link may be a primary link and the second link may be a secondary link. In such cases, in determining whether the channel status of the first link is still idle, processor 1412 may determine whether the channel status of the first link is still idle based on virtual CS, physical CS or both.

In some implementations, in an event that the first link is busy before the backoff procedure counts down to zero, processor 1412 may suspend the backoff procedure on the first link. In such cases, no transmission may be allowed on the second link when the first link is busy or when the first link is busy due to intra BSS transmission. Moreover, the first link may be a primary link and the second link may be a secondary link.

In some implementations, transmissions may be allowed on the second link when the first link is busy due to other transmission not identified as an intra BSS transmission. In such cases, the first link may be a primary link and the second link may be a secondary link.

Illustrative Processes

Figure 15:
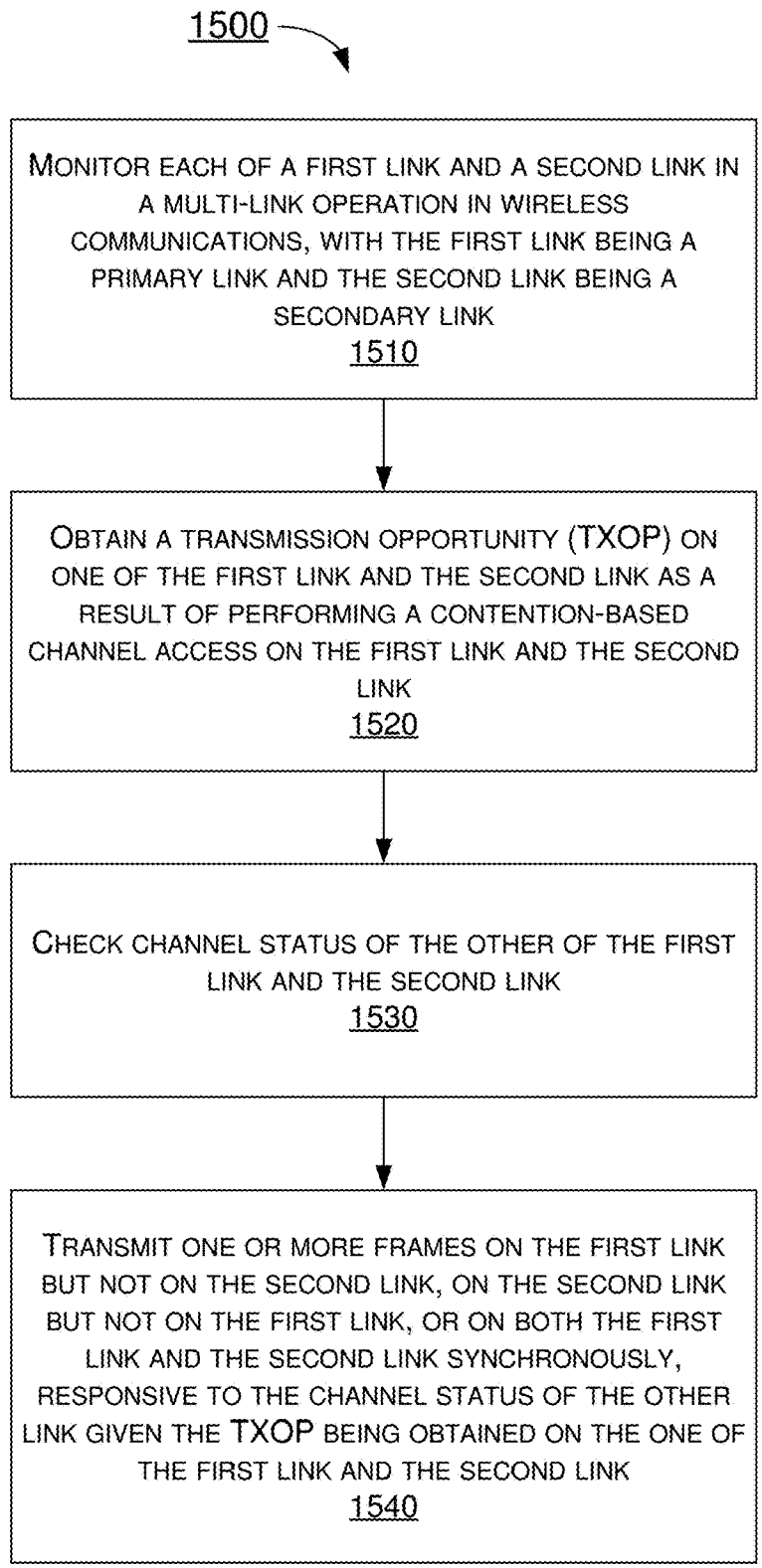
FIG. 15 is a flowchart of an example process in accordance with an implementation of the present disclosure.

FIG. 15 illustrates an example process 1500 in accordance with an implementation of the present disclosure. Process 1500 may represent an aspect of implementing various proposed designs, concepts, schemes, systems and methods described above. More specifically, process 1500 may represent an aspect of the proposed concepts and schemes pertaining to constrained multi-link device operations in wireless communications in accordance with the present disclosure. Process 1500 may include one or more operations, actions, or functions as illustrated by one or more of blocks 1510, 1520, 1530 and 1540. Although illustrated as discrete blocks, various blocks of process 1500 may be divided into additional blocks, combined into fewer blocks, or eliminated, depending on the desired implementation. Moreover, the blocks/sub-blocks of process 1500 may be executed in the order shown in FIG. 15 or, alternatively in a different order. Furthermore, one or more of the blocks/sub-blocks of process 1500 may be executed repeatedly or iteratively. Process 1500 may be implemented by or in apparatus 1410 and apparatus 1420 as well as any variations thereof. Solely for illustrative purposes and without limiting the scope, process 1500 is described below in the context of apparatus 1410 implemented in or as AP 120 and apparatus 1420 implemented in or as STA 125 or STA 115 of a wireless network such as a WLAN in network environment 100 in accordance with one or more of IEEE 802.11 standards. Process 1500 may begin at block 1510.

At 1510, process 1500 may involve processor 1412 of apparatus 1410 monitoring, via transceiver 1416, each of a first link and a second link in a multi-link operation in wireless communications, with the first link being a primary link and the second link being a secondary link. Process 1500 may proceed from 1510 to 1520.

At 1520, process 1500 may involve processor 1412 obtaining a transmission opportunity (TXOP) on one of the first link and the second link as a result of performing a contention-based channel access on the first link and the second link. Process 1500 may proceed from 1520 to 1530.

At 1530, process 1500 may involve processor 1412 checking, via transceiver 1416, channel status of the other of the first link and the second link. Process 1500 may proceed from 1530 to 1540.

At 1540, process 1500 may involve processor 1412 transmitting, via the transceiver, one or more frames on the first link but not on the second link, on the second link but not on the first link, or on both the first link and the second link synchronously, responsive to the channel status of the other link given the TXOP being obtained on the one of the first link and the second link.

In some implementations, responsive to the TXOP being obtained on the first link, in checking the channel status process 1500 may involve processor 1412 checking channel status of the second link. Additionally, responsive to the channel status of the second link being idle, process 1500 may also involve processor 1412 transmitting one or more frames on both the first link and the second link synchronously. Moreover, responsive to the channel status of the second link being not idle, process 1500 may further involve processor 1412 transmitting one or more frames on the first link but not on the second link.

In some implementations, responsive to the channel status of the second link being not idle, in transmitting the one or more frames on the first link but not on the second link, process 1500 may involve processor 1412 performing one of the following: (a) transmitting request to send (RTS) and receiving a clear to send (CTS) before data frame exchange; (b) restarting a backoff timer on the first link with a random selected initial value or the current value of the backoff timer on the second link; or (c) initiating transmission when the second link is determined to be not idle.

In some implementations, responsive to the TXOP being obtained on the second link, in checking the channel status process 1500 may involve processor 1412 checking channel status of the first link. Additionally, responsive to the channel status of the first link being idle, process 1500 may also involve processor 1412 transmitting one or more frames on both the first link and the second link synchronously. Moreover, responsive to the channel status of the first link being not idle, process 1500 may further involve processor 1412 not transmitting any frame on either the first link or the second link.

In some implementations, responsive to the TXOP being obtained on the second link, in checking the channel status process 1500 may involve processor 1412 checking channel status of the first link. Moreover, responsive to the channel status of the first link being not idle, process 1500 may further involve processor 1412 transmitting one or more frames on the second link but not on the first link.

In some implementations, responsive to the channel status of the first link being not idle, in transmitting the one or more frames on the second link but not on the first link process 1500 may involve processor 1412 performing at least one of: (a) transmitting an RTS and receiving a CTS before data frame exchange; and (b) an AP MLD indicating whether the contention-based channel access on the second link only is allowed.

In some implementations, in checking the channel status of the other link process 1500 may involve processor 1412 determining that the channel status of the other link is idle responsive to a virtual CS being idle, a PIFS CS being idle, a backoff timer for the other link being zero or counting down to zero, or a combination thereof.

In some implementations, responsive to the TXOP being obtained on one link of the first link and the second link, the checking of the channel status of the other link may include: (a) waiting for the backoff timer of the other link with a non-zero value counting down to zero and determining the channel status of the other link as idle when the backoff timer reaches zero; or (b) determining the channel of the other link as busy responsive to the backoff timer of the other link having a non-zero value or NAV being non-zero or physical CS busy.

In some implementations, the first link may be a primary link and the second link may be a secondary link. In such cases, the primary link may be configured or signaled to allow at least legacy STAs, single-link STAs, and STAs capable of multi-link operation to operate thereon. Moreover, the secondary link may be configured or signaled to disallow at least the legacy STAs and the single-link STAs to operate thereon.

In some implementations, responsive to the first link being a primary link and the second link being a secondary link, process 1500 may also involve processor 1412 transmitting, via transceiver 1416, system information in one or more management frames on the primary link but not on the secondary link. Alternatively, process 1500 may also involve processor 1412 transmitting, via transceiver 1416, system information in the one or more management frames to limit association attempts from legacy STAs and single-link STAs on the secondary link.

In some implementations, responsive to the first link being a primary link and the second link being a secondary link, the primary link may be signaled in system information transmitted by an AP in one or more management frames.

In some implementations, the first link may be a primary link and the second link may be a secondary link. In such cases, the primary link may have zero or one or more secondary links. Moreover, the secondary link may have one and no more than one corresponding primary link.

Figure 16:
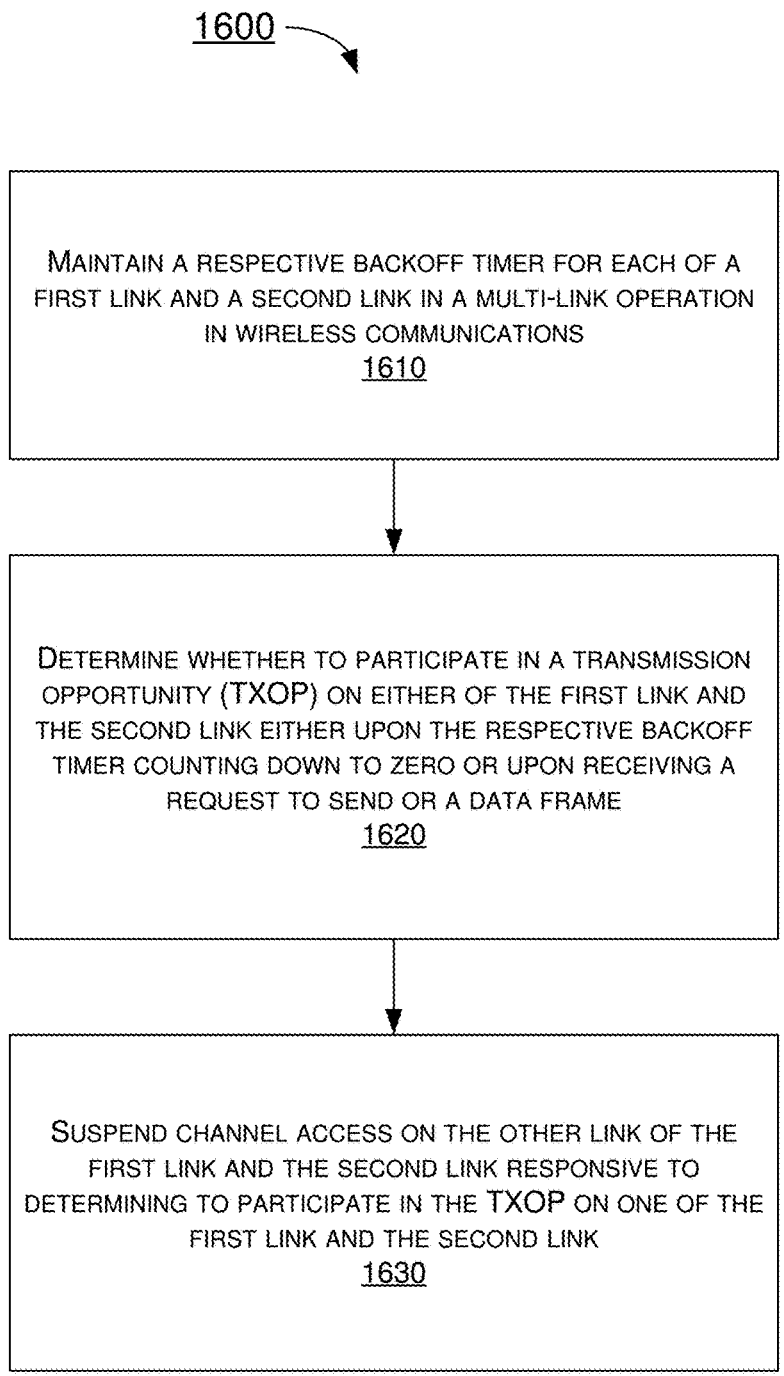
FIG. 16 is a flowchart of an example process in accordance with an implementation of the present disclosure.

FIG. 16 illustrates an example process 1600 in accordance with an implementation of the present disclosure. Process 1600 may represent an aspect of implementing various proposed designs, concepts, schemes, systems and methods described above. More specifically, process 1600 may represent an aspect of the proposed concepts and schemes pertaining to constrained multi-link device operations in wireless communications in accordance with the present disclosure. Process 1600 may include one or more operations, actions, or functions as illustrated by one or more of blocks 1610, 1620 and 1630. Although illustrated as discrete blocks, various blocks of process 1600 may be divided into additional blocks, combined into fewer blocks, or eliminated, depending on the desired implementation. Moreover, the blocks/sub-blocks of process 1600 may be executed in the order shown in FIG. 16 or, alternatively in a different order. Furthermore, one or more of the blocks/sub-blocks of process 1600 may be executed repeatedly or iteratively. Process 1600 may be implemented by or in apparatus 1410 and apparatus 1420 as well as any variations thereof. Solely for illustrative purposes and without limiting the scope, process 1600 is described below in the context of apparatus 1410 implemented in or as AP 120 and apparatus 1420 implemented in or as STA 125 or STA 115 of a wireless network such as a WLAN in network environment 100 in accordance with one or more of IEEE 802.11 standards. Process 1600 may begin at block 1610.

At 1610, process 1600 may involve processor 1412 of apparatus 1410 maintaining a respective backoff timer for each of a first link and a second link in a multi-link operation in wireless communications. Process 1600 may proceed from 1610 to 1620.

At 1620, process 1600 may involve processor 1412 determining whether to participate in a transmission opportunity (TXOP) on either of the first link and the second link either upon the respective backoff timer counting down to zero or upon receiving a request to send or a data frame. Process 1600 may proceed from 1620 to either 1630.

At 1630, process 1600 may involve processor 1412 suspending channel access on the other link of the first link and the second link responsive to determining to participate in the TXOP on one of the first link and the second link.

In some implementations, in suspending the channel access on the other link of the first link and the second link responsive to determining to participate in the TXOP on one of the first link and the second link, process 1600 may involve processor 1412 either: (a) suspending or not invoking the respective backoff timer on the other link of the first link and the second link; or (b) counting down the respective backoff timer to zero but suspending or canceling a transmission on the other link of the first link and the second link responsive to the respective backoff timer for the other of the first link and the second link being non-zero.

In some implementations, process 1600 may further involve processor 1412 participating in the TXOP as a TXOP responder by receiving an RTS or a data frame. Alternatively, process 1600 may further involve processor 1412 initiating the TXOP as a TXOP holder by sending an RTS or a data frame responsive to the respective backoff timer counting down to zero.

Figure 17:
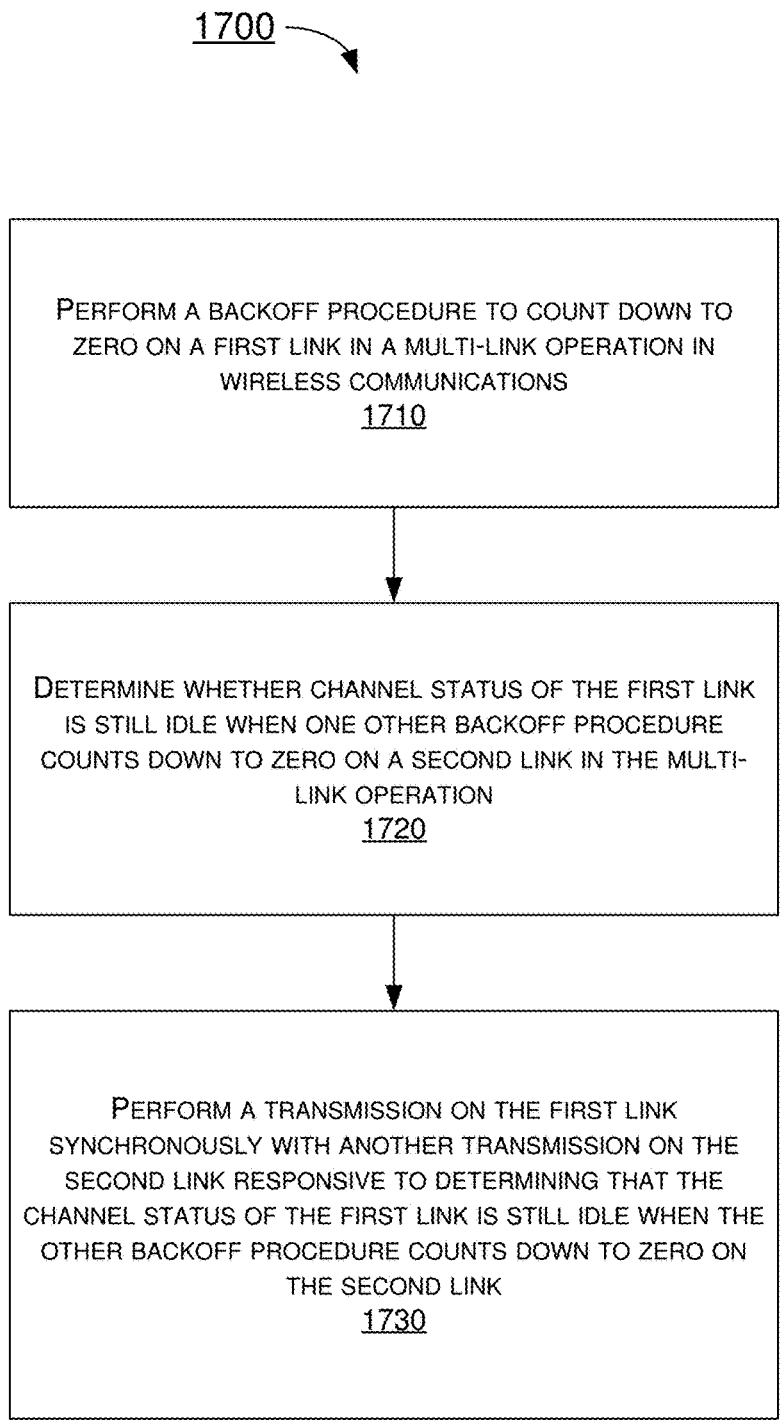
FIG. 17 is a flowchart of an example process in accordance with an implementation of the present disclosure.

FIG. 17 illustrates an example process 1700 in accordance with an implementation of the present disclosure. Process 1700 may represent an aspect of implementing various proposed designs, concepts, schemes, systems and methods described above. More specifically, process 1700 may represent an aspect of the proposed concepts and schemes pertaining to constrained multi-link device operations in wireless communications in accordance with the present disclosure. Process 1700 may include one or more operations, actions, or functions as illustrated by one or more of blocks 1710, 1720 and 1730. Although illustrated as discrete blocks, various blocks of process 1700 may be divided into additional blocks, combined into fewer blocks, or eliminated, depending on the desired implementation. Moreover, the blocks/sub-blocks of process 1700 may be executed in the order shown in FIG. 17 or, alternatively in a different order. Furthermore, one or more of the blocks/sub-blocks of process 1700 may be executed repeatedly or iteratively. Process 1700 may be implemented by or in apparatus 1410 and apparatus 1420 as well as any variations thereof. Solely for illustrative purposes and without limiting the scope, process 1700 is described below in the context of apparatus 1410 implemented in or as AP 120 or STA 125 and apparatus 1420 implemented in or as STA 110 or STA 115 of a wireless network such as a WLAN in network environment 100 in accordance with one or more of IEEE 802.11 standards. Process 1700 may begin at block 1710.

At 1710, process 1700 may involve process 1412 of apparatus 1400 performing a backoff procedure to count down to zero on a first link in a multi-link operation in wireless communications. Process 1700 may proceed from 1710 to 1720.

At 1720, process 1700 may involve processor 1412 determining whether channel status of the first link is still idle when one other backoff procedure counts down to zero on a second link in the multi-link operation. Process 1700 may proceed from 1720 to 1730.

At 1730, process 1700 may involve processor 1412 performing, via transceiver 1416, a transmission on the first link synchronously with another transmission on the second link responsive to determining that the channel status of the first link is still idle when the other backoff procedure counts down to zero on the second link.

In some implementations, the first link may be a primary link and the second link may be a secondary link. In such cases, in determining whether the channel status of the first link is still idle, process 1700 may involve processor 1412 determining whether the channel status of the first link is still idle based on virtual CS, physical CS or both.

In some implementations, in an event that the first link is busy before the backoff procedure counts down to zero, process 1700 may involve processor 1412 suspending the backoff procedure on the first link. In such cases, no transmission may be allowed on the second link when the first link is busy or when the first link is busy due to intra BSS transmission. Moreover, the first link may be a primary link and the second link may be a secondary link.

In some implementations, transmissions may be allowed on the second link when the first link is busy due to other transmission not identified as an intra BSS transmission. In such cases, the first link may be a primary link and the second link may be a secondary link.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising: monitoring each of a first link and a second link in a multi-link operation in wireless communications, with the first link being a primary link and the second link being a secondary link;
    obtaining a transmission opportunity (TXOP) on one of the first link and the second link as a result of performing a contention-based channel access on the first link and the second link; checking channel status of the first link and the other of the first link and the second link; transmitting one or more frames on the second link responsive to the TXOP being obtained on the first link; transmitting one or more frames on both the first link and the second link synchronously responsive to the channel status of the first link being idle responsive to the TXOP being obtained on the second link; and
    transmitting system information in one or more management frames on the first link but not on the second link responsive to the first link being a primary link and the second link being a secondary link.

2. The method of claim 1, wherein, responsive to the TXOP being obtained on the first link, the checking of the channel status comprises checking channel status of the second link, further comprising:
    responsive to the channel status of the second link being idle, transmitting one or more frames on both the first link and the second link synchronously; and
    responsive to the channel status of the second link being not idle, transmitting one or more frames on the first link but not on the second link.

3. The method of claim 2, wherein, responsive to the channel status of the second link being not idle, the transmitting of the one or more frames on the first link but not on the second link comprises: transmitting a request to send (RTS) and receiving a clear to send (CTS) before data frame exchange; or
    restarting a backoff timer on the first link with a random selected initial value or
    the current value of the backoff timer on the second link; or
initiating transmission when the second link is determined to be not idle.

4. The method of claim 1, wherein, responsive to the TXOP being obtained on the second link, further comprising:
responsive to the channel status of the first link being not idle, not transmitting any frame on either the first link or the second link.

5. The method of claim 1, wherein, responsive to the TXOP being obtained on the second link, the checking of the channel status comprises checking channel status of the first link, further comprising:
responsive to the channel status of the first link being not idle, transmitting one or more frames on the second link but not on the first link.

6. The method of claim 5, wherein, responsive to the channel status of the first link being not idle, the transmitting of the one or more frames on the second link but not on the first link comprises at least one of:
transmitting a request to send (RTS) and receiving a clear to send (CTS) before data frame exchange; and an access point (AP) multi-link device (MLD) indicating whether the contention-based channel access on the second link only is allowed.

7. The method of claim 1, wherein the checking of the channel status of the other link comprises determining that the channel status of the other link is idle responsive to a virtual carrier sensing (CS) being idle, a point coordination function (PCF) inter-frame space (PIFS) CS being idle, a backoff timer for the other link being zero or counting down to zero, or a combination thereof.

8. The method of claim 1, wherein, responsive to the TXOP being obtained on one link of the first link and the second link, the checking of the channel status of the other link, further comprising:
waiting for the backoff timer of the other link with a non-zero value counting down to zero and determining the channel status of the other link as idle when the backoff timer reaches zero; or determining the channel of the other link as busy responsive to the backoff timer of the other link having a non-zero value.

9. The method of claim 1, wherein the first link is a primary link and the second link is a secondary link, wherein the primary link is configured or signaled to allow at least legacy stations (STAs), single-link STAs, and STAs capable of multi-link operation to operate thereon, and wherein the secondary link is configured or signaled to disallow at least the legacy STAs and the single-link STAs to operate thereon.

10. The method of claim 1, wherein, responsive to the first link being a primary link and the second link being a secondary link, further comprising: transmitting system information in the one or more management frames to limit association attempts from legacy stations (STAs) and single-link STAs on the secondary link.

11. The method of claim 1, wherein, responsive to the first link being a primary link and the second link being a secondary link, the primary link is signaled in system information transmitted by an access point (AP) in one or more management frames.

12. The method of claim 1, wherein the first link is a primary link and the second link is a secondary link, wherein the primary link has zero or one or more secondary links, and wherein the secondary link has one and no more than one corresponding primary link.

13. A method, comprising: maintaining a respective backoff timer for each of a first link and a second link in a multi-link operation in wireless communications; determining whether to participate in a transmission opportunity (TXOP) on either of the first link and the second link upon the respective backoff timer counting down to zero; transmitting one or more frames on both the first link and the second link synchronously responsive to the channel status of the first link being idle responsive to the TXOP being obtained on the second link; and suspending channel access on the other link of the first link and the second link responsive to determining to participate in the TXOP on one of the first link and the second link by counting down the respective backoff timer to zero but suspending or canceling a transmission on the other link of the first link and the second link responsive to the respective backoff timer for the other of the first link and the second link being non-zero.

14. The method of claim 13, further comprising:
participating in the TXOP as a TXOP responder by receiving a request to send (RTS) or a data frame.

15. The method of claim 13, further comprising:
initiating the TXOP as a TXOP holder by sending a request to send (RTS) or a data frame responsive to the respective backoff timer counting down to zero.

16. A method, comprising:
performing a backoff procedure to count down to zero on a first link in a multi-link operation in wireless communications;
determining whether channel status of the first link is still idle when one other backoff procedure counts down to zero on a second link in the multi-link operation; and
performing one or more frames on both the first link and the second link synchronously responsive to determining that the channel status of the first link is still idle and that a transmission opportunity (TXOP) is obtained on the second link,
wherein the first link is a primary link and the second link is a secondary link.

17. The method of claim 16, wherein the determining whether the channel status of the first link is still idle comprises determining whether the channel status of the first link is still idle based on virtual carrier sense (CS), physical CS or both.

18. The method of claim 16, further comprising:
in an event that the first link is busy before the backoff procedure counts down to zero, suspending the backoff procedure on the first link,
wherein no transmission is allowed on the second link when the first link is busy or when the first link is busy due to intra basic service set (BSS) transmission.

19. An apparatus, comprising:
a transceiver configured to communicate wirelessly; and
a processor coupled to the transceiver and configured to perform, via the transceiver, operations comprising:
monitoring each of a first link and a second link in a multi-link operation in wireless communications, with the first link being a primary link and the second link being a secondary link; obtaining a transmission opportunity (TXOP) on one of the first link and the second link as a result of performing a contention-based channel access on the first link and the second link; checking channel status of the first link and the other of the first link and the second link; transmitting one or more frames on the second link responsive to the TXOP being obtained on the first link;
transmitting one or more frames on both the first link and the second link synchronously responsive to the channel status of the first link being idle responsive to the TXOP being obtained on the second link; and transmitting system information in one or more management frames on the first link but not on the second link responsive to the first link being a primary link and the second link being a secondary link.

20. The apparatus of claim 19, wherein the first link is a primary link and the second link is a secondary link, wherein the primary link is configured or signaled to allow at least legacy stations (STAs), single-link STAs, and STAs capable of multi-link operation to operate thereon, and wherein the secondary link is configured or signaled to disallow at least the legacy STAs and the single-link STAs to operate thereon.

* * * * *